US007186438B2

(12) United States Patent
Hayashida et al.

(10) Patent No.: US 7,186,438 B2
(45) Date of Patent: *Mar. 6, 2007

(54) ARTIFICIAL FINGER PRINT LIQUID, TESTING METHOD FOR OPTICAL INFORMATION MEDIUM USING IT, AND OPTICAL INFORMATION MEDIUM

(75) Inventors: Naoki Hayashida, Tokyo (JP); Toshifumi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/053,547

(22) Filed: Feb. 9, 2005

(65) Prior Publication Data

US 2005/0147006 A1    Jul. 7, 2005

Related U.S. Application Data

(62) Division of application No. 10/489,780, filed as application No. PCT/JP02/09540 on Sep. 17, 2002.

(30) Foreign Application Priority Data

Sep. 19, 2001  (JP)  ............................. 2001-285632
Jul. 5, 2002   (JP)  ............................. 2002-197552

(51) Int. Cl.
    *B05D 7/00*   (2006.01)
(52) U.S. Cl. .............................. 427/8; 427/1; 427/162; 427/352; 356/337; 369/53.41
(58) Field of Classification Search .................... 427/1, 427/8, 162, 352; 356/337; 369/53.41
See application file for complete search history.

(56) References Cited

U.S. PATENT DOCUMENTS

| 2001/0041242 | A1 |   | 11/2001 | Hayashida et al. |        |
|--------------|----|---|---------|------------------|--------|
| 2003/0021888 | A1 | * | 1/2003  | Chang et al.     | 427/58 |
| 2004/0234720 | A1 |   | 11/2004 | Hayashida et al. |        |
| 2005/0013965 | A1 |   | 1/2005  | Itoh et al.      |        |

FOREIGN PATENT DOCUMENTS

| EP | 552636       |   | 7/1993  |
|----|--------------|---|---------|
| EP | 1 146 510 A1 |   | 10/2001 |
| JP | 56-042139 A  | * | 4/1981  |
| JP | 4-339333 A   |   | 11/1992 |
| JP | 6-44617 A    |   | 2/1994  |
| JP | 6-349119     |   | 12/1994 |
| JP | 8-248024     |   | 9/1996  |
| JP | 9-100111     |   | 4/1997  |
| JP | 09-171641 A  | * | 6/1997  |
| JP | 9-212913     |   | 8/1997  |
| JP | 10-110118    |   | 4/1998  |
| JP | 10-151409    |   | 6/1998  |
| JP | 10-302311    |   | 11/1998 |
| JP | 11-185313    |   | 7/1999  |
| JP | 11-293159    |   | 10/1999 |
| JP | 2000-017572  |   | 1/2000  |
| JP | 2000-17572   |   | 1/2000  |
| JP | 2000-82236 A |   | 3/2000  |
| JP | 2001-228302 A |  | 8/2001  |
| JP | 2002-157784 A |  | 5/2002  |
| JP | 2002-190136 A |  | 7/2002  |
| JP | 2002-230837 A |  | 8/2002  |
| JP | 2003-22571 A |   | 1/2003  |
| JP | 2003-168248  |   | 6/2003  |
| JP | 2004-35824   |   | 2/2004  |
| JP | 2004-152418  |   | 5/2004  |
| JP | 2004-171711 A |  | 6/2004  |
| JP | 2004-171741  |   | 6/2004  |
| JP | 2004-185772 A |  | 7/2004  |
| WO | WO 03/029382 |   | 4/2003  |
| WO | WO 2004/040564 A1 | | 5/2004 |

OTHER PUBLICATIONS

JPO computer translation of JP 2001-228302 A, published Aug. 24, 2001.*
JPO computer translation of JP 10-110118 A, published Apr. 28, 1998.*
Naoki Hayashida, et al. "High-Performance Hard Coat for Cartridge-Free Blu-Ray Disc" Japanese Journal of Applied Physics vol. 42, Feb. 2003, pp. 750-753.
Naoki Hayashida, et al. "Anti-Fingerpring Property of the Hard-Coat for Catridge-Free Blu-Ray Disc" Optical Data Storage, vol. 5069, SPIE 0277-786X/03, 2003, pp. 361-368.
TDK Homepage, http://www.tdk.co.jp/, Oct. 28, 2002.
Naoki Hayashida, et al. "Functional Hard-Coat for Cartridge-Free DVR Blue", Joint International Symposium on Optical Memory and Optical Data Storage Technical Digest IEEE Catalog 02EX552 ISBN #0-7803-7379-0, Jul. 2002, pp. 12-14.
Naoki Hayashida, et al. "Anti-Fingerprint Property of the Hard-Coat for Cartridge-Free Blu-Ray Disc" Optical Data Storage, 2003, pp. 18-20.
The Association of Powder Process Industry and Engineering, Japan, "APPIE JIS Test Powders", Sep. 30, 2003 w/ English translation.

* cited by examiner

*Primary Examiner*—Kirsten Jolley
(74) *Attorney, Agent, or Firm*—Oblon, Spivak, McClelland, Maier & Neustadt, P.C.

(57) ABSTRACT

A testing method for an optical information medium using an artificial fingerprint. The artificial fingerprint is made of an artificial fingerprint liquid comprising a fine-particle-form substance and a dispersion medium capable of dispersing the fine-particle-form substance.

6 Claims, 3 Drawing Sheets

ARTIFICIAL FINGER PRINT LIQUID, TESTING METHOD FOR OPTICAL INFORMATION MEDIUM USING IT, AND OPTICAL INFORMATION MEDIUM

CROSS-REFERENCE TO RELATED APPLICATIONS

The present application is a divisional application of U.S. patent application Ser. No. 10/489,780, filed on Mar. 17, 2004, now pending, which is a National Stage (371) of PCT/JP02/09540, filed on Sep. 17, 2002.

TECHNICAL FIELD

The present invention relates to an artificial fingerprint liquid and, more specifically, an artificial fingerprint liquid for evaluating an anti-staining property, a fingerprint adhering property or a fingerprint removing property on the surface of various substances. The present invention also relates to a testing method for an optical information medium such as a reproduction-only optical disk, optical recording disk or magneto-optical recording disk, using the artificial fingerprint liquid. Furthermore, the present invention relates to an optical information medium.

BACKGROUND ART

When an optical disk such as a reproduction-only optical disk, optical recording disk, magneto-optical recording disk, various displays such as a CRT, or various substances such as glass are used, the adhesion of stains or fingerprints to the surface thereof is caused on the basis of various stain materials The adhesion of these stains or fingerprints is unpreferable, and the surface of the various substances is usually subjected to an appropriate surface treatment in order to improve an anti-staining property thereof, decrease a fingerprint adhering property or improve a fingerprint removing property.

For example, about an optical disk, investigations are being made on various water repellent or oil repellent treatments to the surface of the optical disk. In order to check the effect of improving the anti-staining property by the surface treatments, in many cases, there is used a manner of adhering a fingerprint actually onto the optical disk surface and, then, evaluating the wiping-off property thereof with the naked eye. However, such an evaluating manner is poor in quantitativeness and reproducibility.

On the assumption that if the water repellency or the oil repellency of the optical disk surface is high, stain materials are easily removed, the following is frequently performed: measurement of the contact angles of various liquids, such as water and aliphatic hydrocarbons, to the above treated-surface. However, the evaluation based on the contact angle or surface free energy is, in a sense, an indirect evaluating manner. Accordingly, it can be properly used as a manner for evaluating the anti-staining property in only a highly restricted case where the above-mentioned assumption that if the water repellency or the oil repellency is high, excellent anti-staining property is exhibited comes into effect. This evaluating manner gives only a relative evaluation result at best. In other words, when this evaluating manner is applied to an optical disk surface, it is substantially impossible that a threshold value which represents whether or not the disk can be used without causing any practical problem is determined for the contact angle or surface free energy.

In recent years, it has been desired that about optical information media the recording density thereof is made higher in order to store a mass of data such as moving image data. Thus, researches and developments are being actively made for making the density of recording capacity higher. As one of them, the following suggestion is made: as seen in, for example, a DVD, the recording/reproducing wavelength thereof is made short and the numerical aperture (NA) of the objective lens is made large, thereby making the condensed spot diameter of the reproducing/reproducing beam small. As compared with a CD, a recording capacity (4.7 GB/surface) 6 to 8 times. that of the CD is actually attained by changing the recording/reproducing wavelength from 780 nm to 650 nm and changing the numerical aperture (NA) from 0.45 to 0.60. Recently, as a method for recording high-quality moving images for a long time, an attempt has been made to make the recording/reproducing wavelength short up to about 400 nm and making the numerical aperture high up to 0.85, so as to attain a recording capacity 4 times or more that of DVD.

However, when the recording density is made high in this way, the condensed spot diameter of the recording/reproducing beam becomes small. Consequently, the recording medium becomes more sensitive to dust, dirt, fingerprints or the like adhering to the laser beam incident side surface of the medium than the prior art. In particular, about stains containing an organic material, such as fingerprints, a large effect is produced when the stains adhere to the laser beam incident side surface. Since the stains are not easily removed, many countermeasures have been considered so far.

For example, Japanese Laid-open Patent Publication Nos. 10-110118 (1998) and 11-293159 (1999) suggest that when a hard coat agent coated film is formed on a surface of an optical disk substrate made of polycarbonate or the like, a non-crosslinking type fluorine type surfactant is incorporated into the hard coat agent. In order to evaluate the anti-staining property of the hard coat surface of the optical disk, there is performed an operation of adhering an artificial fingerprint liquid wherein a small amount of sodium chloride, urea and lactic acid is dissolved in a mixture solution of water and ethanol onto the surface of the hard coat under pressure, using a pseudo fingerprint, and then determining the wiping-off property thereof with the naked eye. This artificial finger print liquid is a liquid described in JIS K2246: 1994 "Rust Preventing Oil". The JIS standard prescribes a performance-testing method for rust preventing oils used for temporary rust-prevention of metal materials such as steel. Accordingly, the artificial fingerprint liquid is prepared to determine the corrosiveness of metal materials. For this reason, the liquid is not useful at all for purposes other than this. Even if the artificial fingerprint liquid made mainly of water and ethanol is adhered onto a surface of an optical disk substrate made of resin such as polycarbonate, in reality the artificial fingerprint liquid is repelled and is not fixed on the substrate surface in almost all cases. It can be considered from this fact that the resin substrate surface exhibits the same wiping-off property against the artificial fingerprint liquid whether the surface is not subjected to any surface treatment or is subjected to surface treatment. That is, it is hardly significant to use the artificial fingerprint liquid prescribed in JIS K2246: 1994 for evaluation of the anti-staining property or the fingerprint removing property of an optical disk surface.

From such an actual situation, it is desired to develop an artificial fingerprint liquid for quantitatively and with a good reproducibility evaluating the anti-staining property, the fingerprint adhering property or the fingerprint removing property on an optical disk surface. It is also desired to develop a testing method for an optical information medium using the artificial fingerprint liquid.

DISCLOSURE OF THE INVENTION

OBJECTS OF THE INVENTION

Thus, an object of the present invention is to solve the above-mentioned problems of the prior art and provide a low-cost artificial fingerprint liquid for quantitatively and with a good reproducibility evaluating an anti-staining property, and a fingerprint adhering property or a fingerprint removing property on the surface of an optical disk such as a reproduction-only optical disk, optical recording disk, magneto-optical recording disk, various displays such as a CRT, and various substances such as glass.

Another object of the present invention is to provide a testing method for an optical information medium, using the artificial fingerprint liquid, which makes it possible that when a fingerprint adheres onto the laser beam incident side surface of the optical information medium, an effect which recording/reproducing signals receive can be measured quantitatively and with a good reproducibility.

Still another object of the present invention is to provide an optical information medium which is good in the property of wiping off an organic stain, such as a fingerprint, adhering to a surface of the optical recording medium and which can maintain good recording/reproducing property over a long period.

SUMMARY OF THE INVENTION

The present invention comprises the following inventions.

(1) An artificial fingerprint liquid comprising a fine-particle-form substance and a dispersion medium capable of dispersing the fine-particle-form substance.

In the present description, the dispersion medium means only a liquid component which remains as a pseudo fingerprint component after the component is transferred onto a surface of an object to be evaluated, and is distinguished from a diluent which may be used if necessary when the artificial fingerprint liquid is used, most thereof or the whole thereof being finally distilled off after the diluent is transferred.

(2) The artificial fingerprint liquid according to the (1), wherein the dispersion medium has a surface tension ranging from 20 to 50 mN/m at 25° C.

(3) The artificial fingerprint liquid according to the (1) or (2), wherein the dispersion medium is at least one selected from higher fatty acid, derivative of higher fatty acid, terpenes, and derivatives of terpenes.

(4) The artificial fingerprint liquid according to any of the (1) to (3), wherein the fine-particle-form substance has an average particle size of 100 μm or less.

(5) The artificial fingerprint liquid according to any of the (1) to (4), wherein the fine-particle-form substance is at least one selected from inorganic fine particles and organic fine particles.

(6) The artificial fingerprint liquid according to the (5), wherein the fine-particle-form substance includes, as the inorganic fine particles, any one of silica fine particles, alumina fine particles, iron oxide fine particles, and mixtures of any two or more selected from the fine particles.

(7) The artificial fingerprint liquid according to the (5) or (6), wherein the fine-particle-form substance includes, as the organic fine particles, anyone of keratin fine particles, chitin fine particles, chitosan fine particles, acrylic type fine particles, styrene type fine particles, divinylbenzene type fine particles, polyamide type fine particles, polyimide type fine particles, polyurethane type fine particles, melamine type fine particles, and mixtures of any two or more selected from the fine particles.

(8) The artificial fingerprint liquid according to any of the (1) to (7), wherein the fine-particle-form substance includes Kanto loam (powder 1 for a JIS test).

(9) The artificial fingerprint liquid according to any of the (1) to (8), which comprises the fine-particle-form substance at a ratio (weight ratio) of 0.1 to 5.0 in relative to the dispersion medium.

(10) The artificial fingerprint liquid according to any of the (1) to (9), which is diluted by a diluent if necessary when the liquid is used.

(11) The artificial fingerprint liquid according to any of the (1) to (10) for evaluating an anti-staining property, a fingerprint adhering property, or a fingerprint removing property of various object surfaces. In the present invention, examples of the various objects include an optical disk such as a reproduction-only optical disk, optical recording disk, magneto-optical recording disk, various display such as a CRT, and various substances such as glass.

(12) A testing method for an optical information medium, wherein an anti-staining property and/or a fingerprint adhering property of the surface of the optical information medium which is on the incident side of a recording/reproducing beam is/are evaluated by adhering an artificial fingerprint liquid comprising a fine-particle-form substance and a dispersion medium capable of dispersing the fine-particle-form substance onto the medium surface which is on the incident side of the recording/reproducing beam.

(13) The testing method for an optical information medium according to the (12), wherein the anti-staining property and/or the fingerprint adhering property of the surface which is on the incident side of the recording/reproducing beam is/are evaluated by measuring changes in recording property and/or reproducing property generated by the adhesion of the artificial fingerprint liquid.

(14) The testing method for an optical information medium according to the (12) or (13), which is applied to the optical information medium wherein the smallest diameter of the recording/reproducing beam on the surface which is on the incident side of the recording/reproducing beam is 500 μm or less.

(15) A testing method for an optical information medium, wherein a cleaning property and/or a fingerprint removing property of the surface of the medium which is on the incident side of a recording/reproducing beam is/are evaluated by adhering an artificial fingerprint liquid comprising a fine-particle-form substance and a dispersion medium capable of dispersing the fine-particle-form substance onto the medium surface which is on the incident side of the recording/reproducing beam, and subsequently performing an operation for removing the artificial fingerprint liquid.

(16) The testing method for an optical information medium according to the (15), wherein the cleaning property and/or the fingerprint removing property of the surface which is on the incident side of the recording/reproducing beam is/are evaluated by measuring changes in recording property and/or reproducing property generated by the operation for removing the artificial fingerprint liquid.

(17) The testing method for an optical information medium according to the (15), which is applied to the optical information medium wherein the smallest diameter of the recording/reproducing beam on the surface which is on the incident side of the recording/reproducing beam is 500 μm or less.

(18) An optical information medium which comprises a light-transmitting layer and an information recording layer and is used to make a recording/reproducing beam incident into the information recording layer through the light-transmitting layer, wherein when an artificial fingerprint liquid comprising a fine-particle-form substance and a dispersion medium capable of dispersing the fine-particle-form substance is adhered onto the surface of the light-transmitting layer and subsequently an operation for removing the adhered artificial fingerprint liquid is performed, the kinetic friction coefficient of the light-transmitting layer surface after the removing operation does not increase by 0.1 or more from the kinetic friction coefficient before the adhesion of the artificial fingerprint liquid.

(19) The optical information medium according to the (18), wherein when a compound having lubricity is present on the light-transmitting layer surface, the amount of the portion not fixed on the light-transmitting layer surface among the entire compound is 20 mg/m² or less.

(20) The optical information medium according to the (18) or (19), wherein when a layer including a compound which has lubricity and is not fixed on the light-transmitting layer surface is present on the light-transmitting layer surface, the thickness of the above layer is 10 nm or less.

(21) The optical information medium according to any of the (18) to (20), wherein the kinetic friction coefficient of the light-transmitting layer surface is 0.4 or less before the adhesion of the artificial fingerprint liquid.

(22) The optical information medium according to any of the (18) to (21), wherein a Si—O bond is present in at least one portion of the light-transmitting layer surface.

(23) The optical information medium according to any of the (18) to (22), wherein at least one portion of the light-transmitting layer surface includes a fluorine atom.

(24) The optical information medium according to any of the (18) to (23), wherein at least one portion of the light-transmitting layer surface is made of a silane coupling agent which includes a group exhibiting water repellency or oil repellency and which is represented by the following formula (I):

$$R_1—Si(X)(Y)(Z) \qquad (I)$$

[wherein $R_1$ is a substituent having water repellency, oil repellency or lubricity, X, Y and Z are each a monovalent group, and at least one of X, Y and Z is a substituent capable of forming a chemical bond by polycondensation with a hydroxyl group.]

(25) The optical information medium according to any of the (18) to (24), wherein the light-transmitting layer surface is fluorinated by plasma treatment.

(26) The optical information medium according to any of the (18) to (25), wherein at least one portion of the light-transmitting layer is made of diamond-like carbon.

(27) The optical information medium according to any of the (18) to (26), which is used in a system wherein the smallest diameter of a recording/reproducing beam on the light-transmitting layer surface is 500 μm or less.

(28) An optical information medium which comprises a light-transmitting layer and an information recording layer and is used to make a recording/reproducing beam incident into the information recording layer through the light-transmitting layer, wherein when an artificial fingerprint liquid comprising a fine-particle-form substance and a dispersion medium capable of dispersing the fine-particle-form substance is adhered onto the surface of the light-transmitting layer and subsequently an operation for removing the adhered artificial fingerprint liquid is performed, the contact angle of water to the light-transmitting layer surface after the removing operation does not decrease by 15% or more from the contact angle thereof before the adhesion of the artificial fingerprint liquid.

(29) The optical information medium according to the (28), wherein when a compound having water repellency is present on the light-transmitting layer surface, the amount of the portion not fixed on the light-transmitting layer surface among the entire compound is 20 mg/m² or less.

(30) The optical information medium according to the (28) or (29), wherein when a layer including a compound which has water repellency and is not fixed on the light-transmitting layer surface is present on the light-transmitting layer surface, the thickness of the above layer is 10 nm or less.

(31) The optical information medium according to any of the (28) to (30), wherein before the adhesion of the artificial fingerprint liquid, the contact angle of water to the light-transmitting layer surface is 75° or more at 20° C.

(32) The optical information medium according to any of the (28) to (31), wherein before the adhesion of the artificial fingerprint liquid, the contact angle of water to the light-transmitting layer surface is 90° or more at 20° C.

(33) The optical information medium according to any of the (28) to (32), wherein a Si—O bond is present in at least one portion of the light-transmitting layer surface.

(34) The optical information medium according to any of the (28) to (33), wherein at least one portion of the light-transmitting layer surface includes a fluorine atom.

(35) The optical information medium according to any of the (28) to (34), wherein at least one portion of the light-transmitting layer surface is made of a silane coupling agent which includes a group exhibiting water repellency or oil repellency and which is represented by the following formula (I):

$$R_1—Si(X)(Y)(Z) \qquad (I)$$

[wherein $R_1$ is a substituent having water repellency, oil repellency or lubricity, X, Y and Z are each a monovalent group, and at least one of X, Y and Z is a substituent capable of forming a chemical bond by polycondensation with a hydroxyl group.]

(36) The optical information medium according to any of the (28) to (35), wherein the light-transmitting layer surface is fluorinated by plasma treatment.

(37) The optical information medium according to any of the (28) to (36), wherein at least one portion of the light-transmitting layer is made of diamond-like carbon.

(38) The optical information medium according to any of the (28) to (37), which is used in a system wherein the smallest diameter of a recording/reproducing beam on the light-transmitting layer surface is 500 μm or less.

MODES FOR CARRYING OUT THE INVENTION

Figure 1:
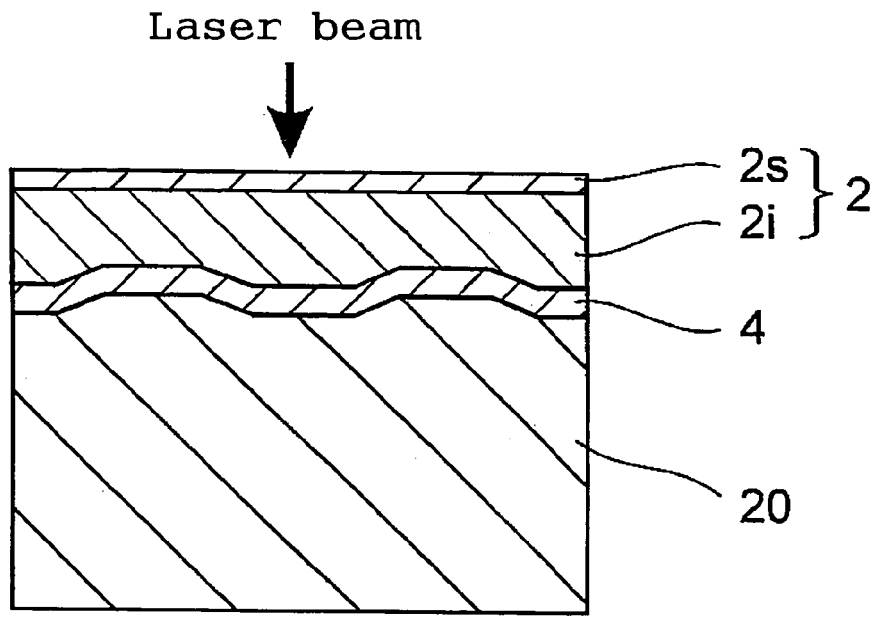
FIG. 1 is a schematic sectional view illustrating a structural example of an optical information medium.

First, an artificial fingerprint liquid of the present invention will be described.

The artificial fingerprint liquid of the present invention comprises a fine-particle-form substance and a dispersion medium capable of dispersing the fine-particle-form substance. The dispersion medium preferably has a surface tension ranging from 20 to 50 mN/mat 25° C. By such a constituent, the artificial fingerprint liquid is made up to an artificial fingerprint liquid having a character as close as possible to an actual fingerprint. Thus, the artificial fingerprint liquid can be suitably used for evaluating an anti-staining property, a fingerprint adhering property, or a fingerprint removing property on various substance surfaces.

In the case that an artificial fingerprint liquid of a homogeneous component system made only of a liquid is used at this time, the liquid does not approximate to the removing property of any actual fingerprint. For example, in the case that triolein, which is one of sebum-constituting components, is used as the homogeneous system, the surface tension of triolein is 34 mN/m at 25 0C. Therefore, the surface of polytetrafluoroethylene (PTFE), which has a critical surface tension of about 18 mN/m, repels triolein completely without getting wet. However, actual fingerprints never fail to be fixed even on the PTFE surface. This is mainly because any fingerprint is not made only of a liquid substance but is made of a heterogeneous system containing an insoluble material and a viscous material. Accordingly, by making a heterogeneous system wherein an appropriate insoluble component is added to a dispersion medium made of a liquid component contained in an actual fingerprint and/or a liquid similar thereto, the artificial fingerprint liquid of the present invention having a character as close as possible to an actual fingerprint can be obtained.

Herein, critical surface tension will be described. The water repellency and the oil repellency of a material can be represented into one way by critical surface tension ($\gamma_c$/mNm$^{-1}$), which is a criterion of the surface free energy of the material. The critical surface tension can be obtained from an actually-measured value of the contact angle thereof. Specifically, the contact angle ($\theta$/rad) to a smooth surface made of a specified material is measured about several saturated hydrocarbon liquids each having a known surface tension (surface tension: $\gamma_1$/mNm$^{-1}$). A value extrapolated to cos $\theta$=1 in plots of cos $\theta$ and $\gamma_1$ is the critical surface tension $\gamma_c$ of the specified material. In order that some material can repel a liquid, it is necessary that the critical surface tension $\gamma_c$ of the material is less than the surface tension $\gamma_1$ of the liquid. For example, $\gamma_c$ of a material having a surface composition of a methylene chain (—CH$_2$—)n is 31 mNm$^{-1}$. Accordingly, the material repels water, which has a surface tension $\gamma_1$ of 73 mNm$^{-1}$ at a temperature of 20° C., but completely gets wet to n-hexadecane, which has a surface tension $\gamma_1$ of 28 mNm$^{-1}$. The contact angle thereof turns to 0 degree.

The artificial fingerprint liquid of the present invention comprises a fine-particle-form substance in the dispersion medium. The majority of solid components contained in any actual fingerprint is a protein called keratin. In the simplest way, therefore, fine powders of keratin are added to and mixed with the dispersion medium having the above physical property values, so that the artificial fingerprint liquid of the present invention can be prepared. Indeed, a mixture wherein keratin fine powders are mixed with a dispersion medium, such as water, oleic acid, squalane or triolein, at an appropriate ratio can be effectively used as the artificial fingerprint liquid of the present invention. However, generally available keratin is remarkably expensive. Thus, a large amount thereof cannot be easily obtained. Furthermore, commercially available keratin has a different particle size distribution from that of keratin contained in actual fingerprints. It is therefore necessary to adjust the particle size distribution thereof in advance if necessary. Accordingly, it cannot be necessarily said that the method of using commercially available keratin is a preferable method from the viewpoint of simplicity, measurement precision and its reproducibility.

In order to solve the problems of keratin, the present inventors researched a fine-particle-form substance which can be used instead of keratin. As a result, it has been found that fine particles having a good wettability to the dispersion medium having the above physical property values and having particle sizes close to that of keratin contained in actual fingerprint components are preferable as the fine-particle-form substance.

The artificial fingerprint liquid of the present invention includes at least one selected from inorganic fine particles and organic fine particles as the fine-particle-form substance. The inorganic fine particles, which are not particularly limited, maybe, for example, silica fine particles, alumina fine particles, iron oxide fine particles, and mixtures of any two or more selected from the fine particles. The organic fine particles, which are not particularly limited, may be, for example, keratin fine particles, chitin fine particles, chitosan fine particles, acrylic type fine particles, styrene type fine particles, divinylbenzene type fine particles, polyamide type fine particles, polyimide type fine particles, polyurethane type fine particles, melamine type fine particles, and mixtures of any two or more selected from the fine particles.

All of the inorganic fine particles exhibit, as the constituting component of the artificial fingerprint liquid, the same effect as keratin fine particles, and are further more inexpensive than the keratin fine particles. Therefore, in order to decrease costs and make the performance stable, the content of the inorganic fine particles is preferably 50% by weight or more, more preferably 80% by weight or more, and considerably preferably 100% by weight of the whole of the fine-particle-form substance. It is advisable that organic fine particles such as keratin fine particles may be used together if necessary. Among the organic fine particles, acrylic type fine particles, styrene type fine particles, divinylbenzene type fine particles, polyamide type fine particles, polyimide type fine particles, polyurethane type fine particles, melamine type fine particles and the like are preferable since they are relatively inexpensive.

The fine-particle-form substance preferably has an average particle size (that is, median diameter) of 100 μm or less, and more preferably has an average particle size of 50 μm or less. Examples of the fine-particle-form substance which includes an inorganic component and has an average particle size of 100 μm or less include JIS Z8901 testing powders 1 and 2, ISO testing powder 12103-1, and the Association of Powder Process Industry and Engineering Japan (APPIE) standard powder. All the testing powders are preferable since they have uniform particle sizes and are available at a relatively low cost. Among examples of the JIS Z8901 testing powder 1, Kanto loam is preferable. It is allowable to use, besides the respective testing powders per se, at least one of inorganic fine particles contained in the respective testing powders, for example, at least one selected from various oxide fine particles such as $SiO_2$, $Fe_2O_3$ and $Al_2O_3$. The average particle size of the fine-particle-form substance is preferably 0.05 µm or more, more preferably 0.5 µm or more. Accordingly, the average particle size of the fine-particle-form substance is preferably 0.05 µm or more and 100 µm or less, more preferably 0.5 µm or more and 50 µm or less. If the fine-particle-form substance is too large or too small, the substrate cannot exhibit easily a sufficient function as an alternate material of keratin contained in actual fingerprints.

The fine-particle-form substance preferably has a critical surface tension at 25° C. larger than that of the used dispersion medium at 25° C., and the critical surface tension is preferably 40 mN/m or more, more preferably 50 mN/m or more. All of the above particles exemplified as the inorganic fine particles have such a desired nature about the critical surface tension.

In the present invention, as the dispersion medium, there is preferably used a liquid having a surface tension ranging from 20 to 50 mN/m at 25° C. and a saturated vapor pressure of 760 mmHg (101325 Pa) or less at 200° C. The liquid which constitutes sweat or sebum of human beings or a liquid having a character close to it usually has such physical property values. Accordingly, it is advisable to use a liquid having the physical property values as the dispersion medium of the artificial fingerprint liquid in the present invention. If the surface tension is less than 20 mN/m at 25° C., the wettability to the surface of an object to be evaluated becomes too high, so that the artificial fingerprint liquid adheres far more easily onto the object surface and is more difficultly removed than actual fingerprints. On the other hand, if the surface tension exceeds 50 mN/m at 25° C., the wettability to the object surface to be evaluated lowers, so that the artificial fingerprint liquid adheres far more difficultly onto the object surface and is more easily removed than actual fingerprints.

If the saturated vapor pressure exceeds 760 mmHg (101325 Pa) at 200° C., the dispersion medium volatilizes gradually after the adhesion of the fingerprint onto the object surface to be evaluated, so that the state of the adhering artificial fingerprint may change in a short time. What degree of easiness of the volatilization of the dispersion medium is after the adhesion of the fingerprint onto the object surface to be evaluated is also affected by the temperature of the object surface to be evaluated, the temperature of the use environment of the artificial fingerprint liquid, or the like.

In the present invention, it is desirable that the viscosity of the liquid used as the dispersion medium is preferably 500 cP or less, more preferably from 0.5 to 300 cP, and still preferably from 5 to 250 cP at 25° C. By having such a viscosity, the dispersion medium causes the fine-particle-form substance to be satisfactorily dispersed and be easily fixed to the object surface even after the adhesion of the fingerprint onto the object surface to be evaluated.

The dispersion medium is not particularly limited, and examples thereof include higher fatty acid, derivatives of higher fatty acid, terpenes, and derivatives of terpenes. Examples of the higher fatty acid include various acids such as oleic acid, linoleic acid, linolenic acid. The derivatives of higher fatty acid may be ester derivatives, and examples thereof include diglyceride derivatives and triglyceride derivatives (for example, triolein). The terpenes may be various terpenes, and examples thereof include squalane, limonene, α-pinene, β-pinene, camphene, linalool, terpineol, and cadinene. It is advisable to select at least one from these and use the selected one alone or the selected two or more in a mixture form. It is also preferable to mix one or more thereof with water and use the mixture.

In the present invention, an appropriate mixing ratio between the fine-particle-form substance and the dispersion medium depends on the method of adhering the artificial fingerprint liquid onto the object surface to evaluated, which method will be described later, and others. Therefore, the mixing ratio cannot be specified without reservation. In general, however, 0.1 to 5.0 weights of the fine-particle-form substance are preferably added per weight of the dispersion medium, and 0.1 to 3.0 weights of the fine-particle-form substance are more preferably added. If the mixing ratio of the fine-particle-form substance to the dispersion medium is too low or too high, it becomes difficult that the resultant functions effectively as an artificial fingerprint liquid. If the fine-particle-form substance is at a ratio less than 0.1, the effect of the addition of the fine-particle-form substance is not obtained, so that the artificial fingerprint liquid is not easily fixed on the object surface to be evaluated or the liquid tends to be easily removed even if the liquid is fixed. On the other hand, if the fine-particle-form substance is added at a ratio over 5.0, liquid crosslinking effect, based on the dispersion medium, on the object surface to evaluated deteriorates, so that the artificial fingerprint liquid tends not to be easily fixed.

The dispersion medium means only liquid components remaining as pseudo fingerprint components after they are transferred to the object surface to be evaluated, and does not include a diluent which will be described later.

In the present invention, it is preferable to add a wax, that is, an ester of higher fatty acid and monovalent alcohol to these dispersion medium components, which are liquid at ambient temperature, so as to make the viscosity of the dispersion medium components high. As the wax, for example, the following may be used: a natural wax such as candelilla wax, carnauba wax, urucury wax, rice wax, sugar wax, wood wax, beeswax, spermaceti, Chinese insect wax, shellac wax, or montan wax; or a synthetic wax such as cholesteryl stearate, myristyl myristate, or cetyl palmitate. The addition percentage of each of the waxes may be appropriately determined in accordance with the property of the object to be evaluated, for example, the property of the recording/reproducing optical system of an optical disk, the purpose of the evaluation, and others.

A general thickener may be added to the artificial fingerprint liquid, examples thereof including carrageenan, gum arabic, xanthan gum, galactomannan, and pectin. Furthermore, in order to improve the dispersibility of the fine-particle-form substance, various surfactants maybe added, examples thereof including quaternary ammonium salts, alkylbenzenesulfonates, and polyoxyethylene polyoxypropylene glycol.

In the present invention, the artificial fingerprint liquid may be diluted with a diluent such as isopropyl alcohol, methyl ethyl ketone or methoxypropanol if necessary in order to improve the transferring property of the artificial fingerprint. Most of these diluents or the whole thereof are finally distilled off after they are transferred to the object surface to be evaluated. The diluent usually has a saturated vapor pressure exceeding 760 mmHg (101325 Pa) at 200° C. It is allowable to add ethanol, liquid paraffin or the like appropriately to the artificial fingerprint liquid.

In a way as described above, the artificial fingerprint liquid of the present invention is composed.

Next, a testing method for an object surface, using the artificial fingerprint liquid of the present invention will be described.

When the artificial fingerprint liquid of the present invention is adhered to a surface of an object to be evaluated, it is preferable to use a pseudo fingerprint transferring stamp made of elastomer. Specifically, it is preferable to produce a pseudo fingerprint transferring stamp made of silicone rubber, butadiene rubber, urethane rubber or the like and use this. The pseudo fingerprint transferring stamp may be made into such a shape that a fingerprint pattern is precisely copied from a mold which is actually obtained from man's fingers. In a simpler way, it is preferable to use a rubber plug for printing an artificial fingerprint liquid prescribed in JIS K2246-1994. That is, it is possible to use, as the pseudo fingerprint transferring stamp, a material the surface of which is roughened by polishing a small circular surface (diameter: about 26 mm) of a No. 10 rubber plug with an AA240 polishing agent prescribed in JIS R6251 or JIS R6252 or a polishing agent having performance similar thereto. However, without limitation to the above-mentioned material, a material capable of giving substantially the same pseudo fingerprint transferring property as described above can be preferably used. In order to obtain a size close to that of an actual fingerprint, an object having a smaller diameter than the above-mentioned rubber plug is preferably used. Specifically, a rubber plug having a diameter of 8 to 25 mm is preferably used, and a rubber plug having a diameter of 8 to 20 mm is more preferably used.

The method of using such a pseudo fingerprint transferring stamp to transfer the artificial fingerprint liquid of the present invention, as a pseudo fingerprint, onto an object surface to be evaluated, such as an optical disk, can be appropriately determined in accordance with the purpose of the evaluation. For example, an original plate for pseudo fingerprint pattern transfer is previously produced, and the rubber plug is used to transfer a pseudo fingerprint from this original plate onto the object surface to be evaluated. Specifically, the artificial fingerprint liquid is uniformly applied onto a rigid substrate made of glass or resin. As the coating method at this time, an appropriate method may be used from various coating methods such as spin coating and dip coating methods. When the artificial fingerprint liquid is applied onto the substrate, the liquid may be diluted with an appropriate organic solvent such as isopropyl alcohol or methyl ethyl ketone in order to obtain a good application property. It is advisable to evaporate these diluents by air drying or heat drying after the application. In this way, the substrate onto which the artificial fingerprint liquid is uniformly applied is produced and this is used as an original plate for pseudo fingerprint pattern transfer.

The pseudo fingerprint transferring stamp is pressed, under a predetermined load, against the surface of this original plate onto which the artificial fingerprint liquid is applied, so as to transfer the artificial fingerprint liquid component onto the transferring stamp. Thereafter, the transferring stamp onto which the artificial fingerprint liquid component is transferred is pressed under a predetermined load against the object surface to be evaluated, so as to transfer the pseudo fingerprint pattern onto the object surface to be evaluated.

The use of the above-described method makes it possible to evaluate, with a good reproducibility, the pseudo fingerprint adhering property in the transferring and further to evaluate, with a good reproducibility, the property for removing the pseudo fingerprint adhered by the transferring. In this way, the anti-staining property of various object surfaces can be quantitatively evaluated with a high reproducibility according to the present invention.

Next, an optical information medium of the present invention, which has an improved fingerprint removing property will be described.

In order to realize an optical information medium having a good fingerprint removing property when a fingerprint removing property testing method based on the above-mentioned artificial fingerprint liquid component is used, the present inventors made various investigations. As a result, it has been made clear that an optical information medium having characters detailed below is desirable.

A structural example of the optical information medium of the present invention is illustrated in FIG. 1. This optical information medium is a recording medium and has, on a relatively high rigid supporting substrate 20, and a recording layer 4 as an information recording layer. The optical information medium has, on this recording layer 4, a light-transmitting layer 2 which is relatively thin and preferably has a thickness of 30 to 300 μm.

Influence, based on adhesion of a fingerprint, on recording/reproducing property depends on the diameter of a laser beam (the smallest diameter in the case that the beam section is elliptic) on the medium surface which is on the incident side of the laser beam. When this diameter is small, large influences as follows are produced: continuous errors, which cannot be corrected, are made. The present inventors' research has demonstrated that in the case that the diameter of the laser beam incident side surface of the medium is 500 μm or less, in particular, 300 μm or less, bad influence on the recording/reproducing property becomes remarkable when a fingerprint adheres to the medium which is being handled. The diameter of the laser beam, on the laser beam incident side surface of the medium, is represented as follows:

$$2t \cdot \tan\{\sin^{-1}(NA/n)\}$$

wherein the thickness of the light-transmitting layer 2 in FIG. 1 is represented by t, the refractive index of the light-transmitting layer 2 is represented by n, and the numerical aperture of the objective lens of the recording/reproducing optical system is represented by NA.

The present invention can be applied regardless of the kind of the recording layer. That is, the present invention can be applied to a recording medium whether the medium is, for example, a phase-change type recording medium, a bit-forming type recording medium or a magneto-optical recording medium. Usually, a dielectric layer or a reflective layer for protecting the recording layer or attaining an optical effect is laid on at least one side of the recording layer. However, the above laid layer is not shown in FIG. 1. The present invention can be applied to a reproduction-only type, as well as a recordable type as illustrated. In this case, a pit row integrated with the supporting substrate 20 is formed, and a reflective layer (metal layer or dielectric multilayered film) covering the pit row constitutes an information recording layer.

Figure 2:
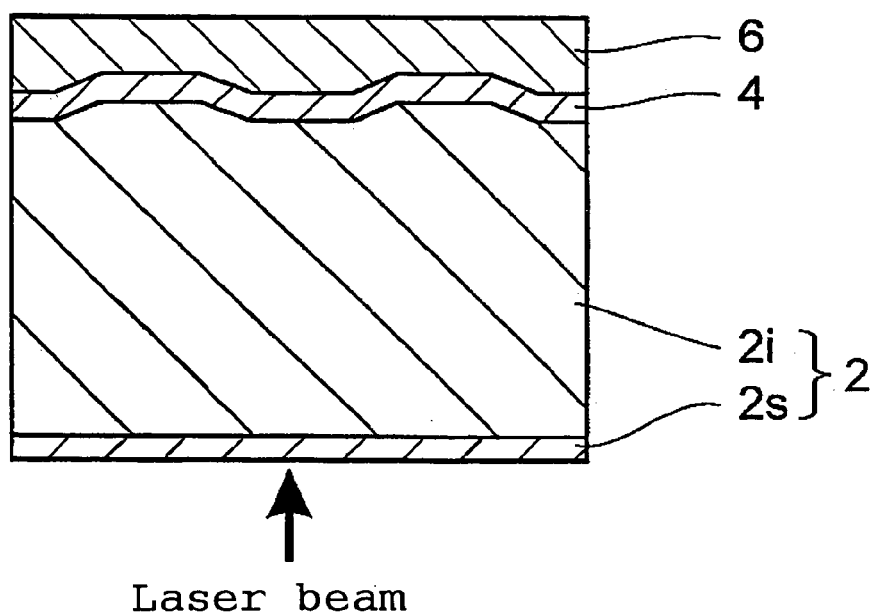
FIG. 2 is a schematic sectional view illustrating another structural example of the optical information medium.

The present invention can also be applied to an optical information medium of a structural example illustrated in FIG. 2. The medium illustrated in FIG. 2 has, on a light-transmitting layer 2, a recording layer 4 and a protective layer 6 in this order. In this structural example, the light-transmitting layer 2 having a relatively high rigidity is used, and the light-transmitting layer 2 also plays a role of a supporting substrate. The two media each having the structure illustrated in FIG. 1 or FIG. 2 are adhered to each other so as to cause the light-transmitting layers 2 to face outwards, so that a two-sided recording type medium can be produced.

In both of the FIGS. 1 and 2, the outer surface of the light-transmitting layer 2 constitutes the laser beam incident side surface of the medium. The recording or reproducing laser beam is made incident into the recording layer 4 through the light-transmitting layer 2.

In order to attain desired performances, the light-transmitting layer 2 may be made into an embodiment made of two or more different layers. As one example thereof, a structure wherein the light-transmitting layer 2 is composed of two layers of an inner layer 2i and a surface layer 2s is illustrated in FIGS. 1 and 2.

In the medium of the present invention, the contact angle of water to the surface of the light-transmitting layer 2 which is on the incident side of the laser beam is preferably 75° or more, more preferably 90° or more at 20° C. The upper limit of the contact angle is not particularly specified, and is generally about 150°. Even if the contact angle is raised to 100° or more, the wiping-off property of fingerprints is not remarkably improved.

Incidentally, examples of means for attaining a contact angle of 90° or more, more specifically about 100° include a method of incorporating a non-crosslinking, fluorine type surfactant into a hard coat agent as described in Japanese Laid-open Patent Publication Nos. 10-110118 (1998) and 11-293159 (1999);and a method of applying a fluorine-containing polymer, a typical example of which is perfluoropolyether, onto the surface of the light-transmitting layer as disclosed in Japanese Laid-open Patent Publication No. 2000-082236. There is also known a method of using, for example, a silicone-type polymer or the like, as well as the fluorine-containing compound.

However, in the case of the method of incorporating a fluorine type or a silicone type surfactant excellent in water repellency and oil repellency into a hard coat, water repellency and oil repellency are exhibited by the surfactant exuding onto the surface of the hard coat; therefore, the exuding surfactant is removed from the hard coat surface when a fingerprint is wiped off. Consequently, the water repellency of the hard coat surface is largely deteriorated by the wipe of the fingerprint. Since the exuding surfactant is not fixed onto the hard coat surface, the surfactant has fluidity. Accordingly, the fingerprint component adhering onto the hard coat surface is blended with the surfactant. The blend of the surfactant with the fingerprint component is further promoted by the wiping work of the fingerprint. Conversely, therefore, it becomes difficult to remove the fingerprint by the wiping work. A similar problem is caused in the method of applying the fluorine type polymer or the silicone type polymer onto the surface of the light-transmitting layer.

In Japanese Laid-open Patent Publication No. 11-293159 (1999), as the surfactant incorporated into the hard coat, the following two are together used: a non-crosslinking fluorine type surfactant which is easily wiped off and a crosslinking fluorine-type surfactant good in wiping-off resistance. However, in the invention described in the same publication, the crosslinking fluorine type surfactant compensates for the anti-staining property after the non-crosslinking fluorine type surfactant is wiped off, as described in paragraphs [0021] to [0023] of the publication. That is, the invention described in the same publication is not any invention for solving the promotion of the blend of the surfactant with the fingerprint component by the wiping-off work of fingerprints.

Such a fatal problem has not been pointed out so far. This is because there has not existed any method for testing fingerprint removing property quantitatively wherein the adhesion of an actual fingerprint is satisfactorily imitated.

Accordingly, about the optical information medium of the present invention, especial attention should be paid so as not to cause blend of a fluid component present on the surface of the light-transmitting layer with an adhering fingerprint component. It can easily be checked whether or not the fluid component miscible with the fingerprint component is present on the light-transmitting layer surface by the following method.

In the case that the fluid component contains a compound having lubricity, the presence of the fluid component can be checked by performing an operation for wiping off the light-transmitting layer surface with a cloth and then examining a change in the kinetic friction coefficient before and after the wiping-off operation. Specifically, a cloth (for example, Bemcot Lint Free CT-8, manufactured by Asahi Chemical Industry Co., Ltd.) is impregnated with the artificial fingerprint liquid component, and then the light-transmitting layer surface is scrubbed 6 to 400 times, preferably 10 to 200 times at a load of 1.0 to 10 N/cm$^2$. Thereafter, a volatile organic solvent such as methanol, ethanol, methyl ethyl ketone or acetone is used to perform an operation for removing the artificial fingerprint liquid component remaining on the light-transmitting layer surface. Moreover, the kinetic friction coefficient of the surface is measured. Instead of removing the artificial fingerprint liquid component with the volatile organic solvent, the optical information medium may be heated to perform an operation for distilling off the artificial fingerprint liquid component.

When the kinetic friction coefficient after the artificial fingerprint liquid component is wiped off with the cloth increases by 0.1 or more from the kinetic friction coefficient at the initial stage (before the wiping), a significant amount of the fluid component may be regarded as being present on the light-transmitting layer surface. Conversely, if the increase amount of the kinetic friction coefficient is less than 0.1, bad influence is hardly produced on the fingerprint removing property even if a very small amount of the fluid component is present. The kinetic friction coefficient is preferably measured by a method which will be described later.

In the case that the fluid component contains a compound having water repellency, the presence of the fluid component can be checked by examining a change in the contact angel of water before and after the wiping-off operation. In this case, a significant amount of the fluid component may be regarded as being present on the light-transmitting layer surface if the contact angle after the wiping-off operation decreases by 15% or more of the contact angle at the initial stage (before the wiping). Conversely, if the decrease amount of the contact angle is less than 15%, bad influence is hardly produced on the fingerprint removing property even if a trace amount of the fluid component is present.

In order that in the measurement of the change in the kinetic friction coefficient the increase amount of the kinetic friction coefficient will be less than 0.1 or in the measurement in the change in the contact angle the decrease amount of the contact angle will be less than 15%, the amount of the fluid component, that is, the amount of the compound not fixed on the light-transmitting layer surface by chemical bonds or the like (the existence amount thereof per unit area of the light-transmitting layer) is preferably set into 20 mg/m$^2$ or less, more preferably 10 mg/m$^2$ or less, and still more preferably 5 mg/m$^2$ or less. The thickness of the layer made of the fluid component on the light-transmitting layer surface is preferably set into 10 nm or less, more preferably 5 nm or less, and still more preferably 2 nm or less.

Furthermore, in the optical information medium of the present invention, it is desirable to make the abrasion or wear resistance and the scratch resistance of the surface high in order not to generate scratches and others in the light-transmitting layer surface even if the operation for wiping off an adhering fingerprint is repeated. Specifically, the pencil hardness measured by the method according to JIS K5600-5-4:1999 (ISO/DIS 15184:1996) is preferably B or more, more preferably HB or more.

In a wear testing method based on abrasive wheels according to ISO 9352:1995, ΔHaze (%) measured under the following conditions is preferably 15% or less, more preferably 7% or less. That is, the cloudiness value is measured with a haze meter after a CS-10F is used as the abrasive wheels and 100-rotation wear is carried out under a load of 4.9 N. At this time, as a testing sample, a light-transmitting layer on which a reflective film or an information recording layer such as a phase-change film is not formed is used. In the case of the low rigid light-transmitting layer 2 made of a resin layer or a resin sheet as illustrated in FIG. 1, a sample wherein the light-transmitting layer 2 is formed, without forming any information recording layer, directly onto the supporting substrate 20 is used as the testing sample. In the case that the supporting substrate 20 is not transparent in an actual medium, the following is used instead of the actual supporting substrate 20: a supporting substrate made of a transparent resin such as polycarbonate, methyl methacrylate, or amorphous polyolefin.

An optical information medium excellent in the property for removing an adhering fingerprint can be realized by using a light-transmitting layer as described above, wherein: the contact angle of water is 75° or more; a decrease in the contact angle of water and an increase in the kinetic friction coefficient are kept less than 15% of the initial value and less than 0.1 thereof, respectively, after the artificial fingerprint liquid component is adhered and then removed; the pencil hardness is B or more; and the cloudiness value after the wear test is 15% or less.

However, even about such an optical information medium excellent in fingerprint removing property, there is a case in which when a user actually performs an operation for wiping off stains, the user feels that the wiping-off is not easy. Even about an optical information medium which is not really excellent in fingerprint removing property, there is a case in which the user feels that stains are easily wiped off. It has been found that such dissociation between the actual fingerprint removing property and user's feeling that the wiping-off is easy depends on the magnitude of the kinetic friction coefficient of the light-transmitting layer surface in most cases. That is, when the kinetic friction coefficient of the light-transmitting layer surface is low, it is felt that the wiping-off is easy even if the actual fingerprint removing property is poor. Conversely, when the kinetic friction coefficient of the surface is high, it is felt that the wiping-off is difficult even if the actual fingerprint removing property is excellent. This is because, for example, it is felt that the cloth is caught at the time of the wiping-off.

In principle, actual fingerprint wiping-off property is regarded as more important than sensuous fingerprint wiping-off property. It is however desired that no dissociation is present between such sensuous fingerprint wiping-off property which human beings feel and actual fingerprint wiping-off property, which is quantitatively measured, since users actually perform wiping works by hand.

The inventors repeated investigation on correlation between the magnitude of the kinetic friction coefficient and the above-mentioned sensuous fingerprint removing property. As a result, it has been proved that when the kinetic friction coefficient of the light-transmitting layer surface is 0.4 or less, preferably 0.3 or less, the fingerprint wiping-off property can be considered to be good regardless of other properties such as surface hardness, water repellency and oil repellency.

The kinetic friction coefficient is preferably measured according to the testing method prescribed in ISO 8295: 1995. However, some other method may be used if the method does not give a remarkably different measured value. However, even if any testing method is used, it is preferable to use, as a slider, a rectangular or circular piece the contact area of which to the light-transmitting layer surface is 4.0 cm$^2$ or less. The contact area of the slider to the light-transmitting layer surface may be substantially zero. That is, the slider may undergo point contact. When the slider is caused to undergo point contact, the curvature radius of the above slider is preferably set into 0.1 to 10 mm. The load applied to a test piece by the slider is controlled into a constant value within the range of $1.0 \times 10^{-3}$ to $9.8 \times 10^{-1}$ N regardless of the contact area. Usually, in the above-mentioned testing method described in ISO 8295:1995, two test pieces made of the same material are made into a pair and the test is made in the state that these test pieces are brought into contact with each other. However, in the case that it is evident that substantially the same result as in this case can be obtained, the raw material of the test piece on which the slider is put may be changed to raw material different from the material the kinetic friction coefficient of which is desired to be measured. For example, as the test piece on which the slider is put, a flat and smooth glass plate or plastic material can be used. Specific examples of the plastic material include various resins such as nylon, polypropylene, polyester, polyimide, polyarylate, and polyacetal. The slider per se may also function as one of the test pieces without preparing the slider and the test piece on which the slider is put separately.

The optical information medium satisfying all of the requirements detailed above can be realized, for example, by the following method. That is, the inner layer 2$i$ in the light-transmitting layer 2 is made up to a layer made of a thermoplastic resin or a radiation curable resin; the surface layer 2$s$ formed to contact this is made of a transparent material excellent in abrasion resistance and scratch resistance as compared with the inner layer 2$i$; and further the surface of the surface layer 2$s$ is subjected to treatment for giving water repellency, oil repellency and lubricity. The radial ray in the description is a concept including both of an electromagnetic wave, such as an ultraviolet ray, and a particle ray, such as an electron ray.

The whole of the light-transmitting layer 2 may be made of a transparent material excellent in abrasion resistance and scratch resistance. However, the light-transmitting layer 2 is preferably composed of the inner layer 2$i$ and the surface layer 2$s$, which are separated form each other, as described above since a large warpage is easily generated in the light-transmitting layer made of a highly hard resin.

The inner layer 2$i$ is preferably a substrate or sheet made of a thermoplastic resin such as polycarbonate, polymethyl methacrylate or amorphous polyolefin, or a coating made of a radiation curable resin, a typical example of which is acrylic ultraviolet curable resin.

As the material of the surface layer 2$s$, a radiation curable resin may be used, examples of which include acrylic ultraviolet curable resin and epoxy ultraviolet curable resin. It is however necessary to select a resin material having a tensile elasticity or Young's modulus after the resin is set higher than that of the resin used as the material of the inner layer 2$i$. In order to make the abrasion resistance and the scratch resistance of the light-transmitting layer surface sufficient, it is preferable to add inorganic fine particles made of colloidal silica or the like into the resin material in advance and make a state that the inorganic fine particles are dispersed in the coating after being hardened. Specifically, inorganic fine particles made of silica, alumina, titanina, zirconia, titanium nitride, aluminum nitride, silicon carbide, calcium carbide or the like are added to a radiation curable resin matrix in such a manner that the percentage thereof in the resultant film after being hardened will be set into 5 to 80%, more preferably 10 to 60% by weight. If necessary, the resultant mixture is then diluted with a non-reactive organic solvent. Furthermore, the mixture is applied onto the surface of the inner layer 2$i$ and hardened. The average particle size of the added inorganic fine particles is preferably 100 nm or less, more preferably 50 nm or less. An example of a commercially available product of the radiation curable resin in which inorganic fine particles are dispersed is a Desolight Z7503 (manufactured by JSR Co., Ltd.).

As the material of the surface layer 2$s$, a thermoset organic composition can be preferably used. After the thermosetting, a part of organic groups thereof may remain, or the organic composition may turn to a substantially complete inorganic compound. As such a composition, a composition having a Si—O bond is preferable. Specifically, the following may be used: a hardened coating formed from a solution containing an organic silicon compound such as tetraalkoxysilane by sol-gel process; a thin film made mainly of SiO$_2$ formed from a polysilazane solution through hydrolysis reaction; or the like. The material which makes the hardened coating containing SiO$_2$ by sol-gel process is a TS-56 (manufactured by Tokuyama Corp.) as a commercially available product, or the like. The material which makes the hardened coating made mainly of SiO$_2$ from polysilazane is an N-L110 (manufactured by Tonen general Sekiyu K. K.) as a commercially available product.

An inorganic and/or organic thin film formed by a vacuum film-forming method, such as sputtering or ion plating, can also be preferably applied.

The thickness of the surface layer 2$s$ made of the radiation curable resin is preferably set into from 0.2 to 10 μm, more preferably from 0.5 to 5.0 μm. On the other hand, in the case that the inorganic thin film formed by a thermosetting process, such as sol-gel process, or a vacuum film-forming method, such as sputtering, is used as the material of the surface layer 2$s$, the film thickness thereof preferably ranges from 10 to 1000 nm, more preferably from 30 to 500 nm. If the surface layer 2$s$ is too thin, the effect based on the formation of the surface layer 2$s$ is insufficiently realized. On the other hand, if the surface layer 2$s$ is too thick, the medium is easily warped.

The surface layer 2$s$ may be formed by laminating an inorganic thin film on a resin layer made of a radiation curable resin.

The thickness of the whole of the light-transmitting layer 2 is determined by requests of a recording/reproducing. wavelength and a recording/reproducing optical system applied to the medium. It is therefore advisable to determine the thickness of the inner layer 2$i$ in such a manner that the total thickness of the surface layer 2$s$ and the inner layer 2$i$ can satisfy the above requests.

The material which constitutes the surface layer 2$s$ may contain a non-crosslinking non-reactive lubricant, a water repellent, an oil repellent, an antistatic agent, a leveling agent, a plasticizer or the like. However, it is required that the added amount thereof is appropriately adjusted to fall the change rate of the contact angle before and after the above-mentioned sliding test based on the artificial fingerprint liquid component within the range of less than ±10%. The appropriate added amount, which intensely depends on the kinds of the additives and the surface layer 2$s$ material, conditions for forming the surface layer 2$s$, and others, cannot be determined without reservation. In general, however, the ratio of the various additives in the hardened film is preferably 3% or less by weight, more preferably 1% or less by weight.

Preferably, the method for giving water repellency, oil repellency and lubricity to the laser beam incident side surface of the medium is, for example, a method of forming the surface layer 2$s$ and subsequently giving water repellency, oil repellency and lubricity to the surface of the surface layer 2$s$. In order to give water repellency, oil repellency and lubricity to the surface of the surface layer 2$s$, it is preferable to cause fluorine atoms to be present on the above surface.

Specifically, a silane coupling agent represented by the following formula (I):

wherein R$_1$ is a substituent having water repellency, oil repellency and lubricity, X, Y and Z are each a monovalent group, and at least one of X, Y and Z is a substituent capable of forming a chemical bond by polycondensation with the hydroxyl group present on the surface of the underlying (surface layer 2$s$) on which the layer of the silane coupling agent is to be formed.

The substituent represented by R$_1$, which has water repellency, oil repellency and lubricity is a group which causes a compound wherein this group is introduced to exhibit water repellency, oil repellency and lubricity. The water repellency and oil repellency of a material can be represented into one way by the critical surface tension ($γ_c$/mNm$^{-1}$ which is a criterion of the surface free energy of the material.

The water repellent, oil repellent and lubricant group represented by R$_1$ is preferably a group having a fluorinated hydrocarbon group, and examples thereof include fluorinated alkyl groups, and fluorinated alkyl groups containing a fluorinated alkyleneoxy group. The total carbon number thereof can be selected from the range of 1 to 5000. The fluorinated hydrocarbon group may be in a normal chain form or a branched chain form, and is preferably in a normal chain form.

Specific examples of such a fluorinated hydrocarbon group may include a fluorinated polyolefin segment represented by the following formula (II) or (III) and a fluorinated polyether. segment represented by the following formula (IV) or (V):

In the formulae (II) to (V), x and y are positive integers, and these are preferably within the range of 0 to 200.

These have excellent water repellency, oil repellency and lubricity. In particular, about the carbon chain thereof, a chain in a long normal chain form, which has no branched structure, exhibits better water repellency, oil repellency and lubricity. The reactive groups in the silane coupling agent, that is, X, Y and Z in Si (X)(Y)(Z)in the formula (I) are preferably substituents which are each capable of forming a chemical bond by polycondensation with a hydroxyl group, in particular, substituents which are each capable of forming Si—O—Si by polycondensation with the hydroxyl group which a silanol group has. As such a substituent, the following can be preferably selected: halogen, —OH (hydroxyl), —$OR_2$ (alkoxy), —OC(O)$CH_3$ (acetoxy), —$NH_2$ (amino), —N=C=O (isocyanic acid), or the like. $R_2$ is an alkyl group. Preferable examples of the halogen include Cl and Br. The total carbon number of alkyl group $R_2$ in —$OR_2$ is from 1 to 5, and the group may be in a normal chain form or in a branched chain form. The group may have a substituent which does not inhibit any chemically adsorbing reaction. For this reason, for example, halogen is not preferable. Specific examples of —$OR_2$ include methoxy, ethoxy, propoxy, isopropoxy, butoxy, isobutoxy, and t-butoxy.

X, Y and Z may be the same or different from each other. When they are different, they may be, for example, halogens different from each other or alkoxy groups different from each other, or a mixture of two or three kinds of halogen, hydroxy, alkoxy, acetoxy, amino and isocyanic acid. It is unnecessary that all of X, Y and Z are reactive substituents. It is sufficient that at least one thereof is, for example, a hydrolyzable group of the above-mentioned halogen, alkoxy, hydroxy, acetoxy, amino or isocyanic acid. In order to form a strong siloxane bond network, all of X, Y and Z are preferably the above-mentioned reactive groups. In the case that X, Y or Z is not the above-mentioned reactive group, examples of the monovalent group as X, Y or Z include a hydrogen atom and alkyl groups having 1 to 5 carbon atoms.

Such a silane coupling agent is, for example, a commercially available product under a trade name of DSX (manufactured by Daikin Industries, Ltd.).

The method for forming the layer of the silane coupling agent is not particularly limited, and an ordinary method can be used, example of which include spin coating, dip coating, and spray coating. At the time of the coating, the silane coupling agent may be appropriately diluted with a solvent.

The silane coupling agent layer has a thickness equivalent to that of a monomolecular film or a super thin film close to it. The thickness is about 1 to 20 nm.

In order to cause the silane coupling agent and the surface layer 2s to conduct chemical absorbing reaction satisfactorily, it is preferable to make the surface of the surface layer 2s hydrophilic in advance by such a method as plasma radiation, corona discharge treatment or electron beam radiation.

As the method for giving water repellency, oil repellency and lubricity to the optical information medium surface, there can also be preferably used a method of fluorinating the surface of the surface layer 2s by plasma treatment using a fluorine compound. The present method is a method of subjecting the surface layer 2s to surface treatment with plasma of a fluorine compound, a typical example of which is tetrafluoroethane. In this treatment, the following advance(s): the fluorination of the surface layer 2s per se, and/or the precipitation of a polymer of the fluorine compound on the surface layer 2s surface. As the fluorine compound used, preferable is an organic fluorine compound, a typical example of which is tetrafluoromethane ($CF_4$) or tetrafluoroethylene ($C_2F_4$), or an inorganic fluorine compound such as $SF_6$ or $NF_3$.

Besides, the following method may also be used: a method of forming a lubricant layer made of a fluorine-containing polymer such as perfluoropolyether, a silicone polymer such as polydimethylsiloxane, or the silane coupling agent on the surface of the surface layer 2s by coating, and subsequently conducting plasma discharge treatment, thereby forming strong chemical bonds in the interface between the surface layer 2s and the lubricant layer. As a plasma supplying source in the plasma discharge treatment, there may be used a compound containing no fluorine atom, such as methane ($CH_4$), ammonia ($NH_3$), or diborane ($B_2H_6$) besides the above-mentioned various fluorine-containing compounds. About lubricant layer constituting materials such as fluorine-containing polymer and silicone polymer, it is not particularly limited whether or not the materials have a reactive terminal group such as a carboxyl group, an isocyanate group or an acryloyl group. A commercially available product of the fluorine-containing polymer is, for example, a Fomblin Z60 manufactured by Ausimont K. K., and a commercially available product of the silicon polymer is, for example, a KF-96 manufactured by Shin-Etsu Chemical Co., Ltd.

In the case that the surface layer 2s per se has water repellency, oil repellency and lubricity, the above-mentioned surface treatment may not be conducted. The case that the surface layer 2s per se has water repellency, oil repellency and lubricity is, for example, a case wherein the surface layer 2s is formed using materials as described below.

The surface layer 2s which per se has water repellency, oil repellency and lubricity may be a layer containing a compound having a polymer main chain wherein the polymer main chain and/or a side chain exhibits water repellency, oil repellency and lubricity. Specific examples thereof are preferably substances wherein a water repellent, oil repellent and lubricant group such as a perfluoroalkyl group is introduced into a side chain of a polymer compound such as polymethyl methacrylate, polycarbonate, or amorphous polyolefin. It is also allowable to use a radiation curable resin such as an ultraviolet curable resin to form the surface layer 2s; disperse fine particles made of an inorganic material or a resin in this resin; and further modify the surfaces of the fine particles with a substance containing a water repellent, oil repellent and lubricant substituent such as a fluorinated hydrocarbon. By applying such a radiation curable resin and curing the resin, the surface layer 2s having water repellency, oil repellency and lubricity can be formed. In this case, a preferable particle size of the fine particles and a preferable ratio of the fine particles in the surface layer 2s are the same as in the above-mentioned case, wherein inorganic fine particles such as colloidal silica are dispersed in the surface layer 2s.

The surface layer 2s may be made up to a film made of DLC (Diamond Like Carbon). The DLC film can be formed by a method known in the prior art, such as sputtering or CVD. Since the DLC thin film is high in surface hardness and excellent in abrasion resistance and simultaneously the film can make the fraction coefficient of the surface low, the various surface treatments for giving lubricity may not be conducted.

The above-mentioned embodiment of the light-transmitting layer makes it possible to produce an optical information medium which is excellent in fingerprint removing property and has practically sufficient abrasion resistance.

EXAMPLES

The present invention will be more specifically described by way of the following examples. However, the present invention is not limited to these examples.

Example 1

Artificial Fingerprint Liquid

In Example 1, an optical recording disk is selected as an object to be evaluated, and the usefulness of the artificial fingerprint liquid of the present invention is described.

Optical recording disk samples No. 0 and No. 1 of two kinds, which have different laser beam incident side surfaces, were separately produced as follows. The layer structure of the optical recording disks is illustrated in FIG. 3.

Figure 3:
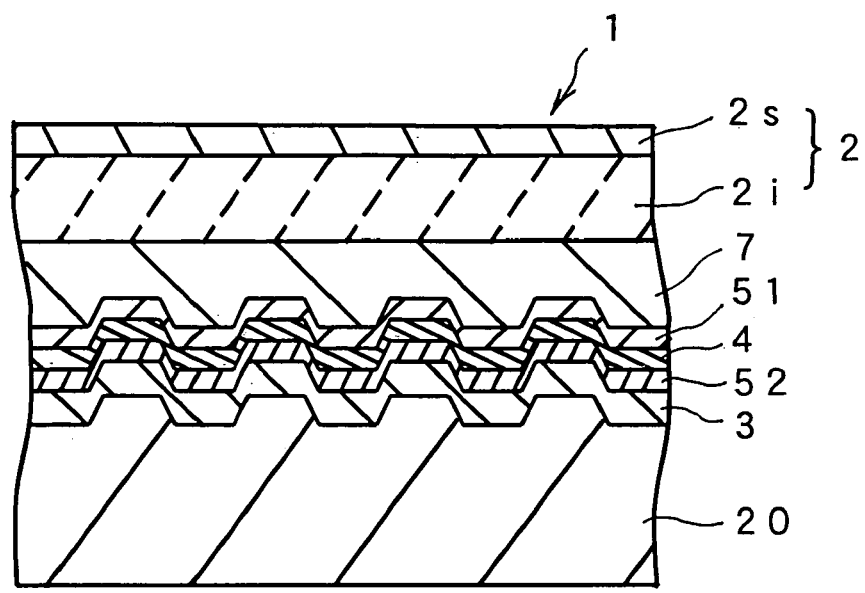
FIG. 3 is a schematic sectional view of an optical recording disk sample used in Examples.

In FIG. 3, an optical disk 1 has a reflective layer 3, a second dielectric layer 52, a recording layer 4, a first dielectric layer 51, in this order, on one surface side of a supporting substrate 20 on which fine concave-convex such as information pits or pregrooves are made; has a resin layer 7 on the first dielectric layer 51; and has a light-transmitting layer 2 on the resin layer 7. The optical disk 1 is used in the state that recording or reproducing laser light is made incident thereon through the light-transmitting layer 2. In disk sample No. 0, the light-transmitting layer 2 is made of a single layer of only an inner layer $2i$. In disk sample No. 1, the light-transmitting layer 2 is made mainly of two layers Of an inner layer $2i$ and a surface layer $2s$.

[Production of Disk Sample No. 0]

The reflective layer 3 made of $Al_{98}Pd_1Cu_1$ (atomic ratio) and having a thickness of 100 nm was formed by sputtering on the surface of the disk-form supporting substrate 20 (made of polycarbonate, diameter: 120 mm, thickness: 1.2 mm) in which grooves were made. The depth of the above grooves, which is represented by light-path length at wavelength $\lambda=405$ nm, was set into $\lambda/6$. The recording track pitch in the groove-recording scheme was set into 0.3 μm.

Next, an $Al_2O_3$ target was used to form the second dielectric layer 52 having a thickness of 20 nm on the surface of the reflective layer 3 by sputtering. An alloy target made of a phase-change material was used to form the recording layer 4 having a thickness of 12 nm on the surface of the second dielectric layer 52 by sputtering. The composition of the recording layer 4 (atomic ratio) was set into $Sb_{74}Te_{18}$ $(Ge_7In_1)$. A ZnS (80% by mole) —$SiO_2$ (20% by mole) target was used to form the first dielectric layer 51 having a thickness of 130 nm on the surface of the recording layer 4 by sputtering.

Next, a radical polymerizable ultraviolet curable resin solution (4X108E, manufactured by Mitsubishi Rayon Co., Ltd., solvent: butyl acetate) was applied onto the surface of the first dielectric layer 51 by spin coating, so as to form the resin layer 7 in such a manner that the thickness thereof would be 2.0 μm after being cured.

Next, in vacuum (0.1 atmospheric pressure or less), a polycarbonate sheet having a thickness of 100 μm was put on the resin layer 7. As the polycarbonate sheet, a Pure Ace, manufactured by Teijin Ltd., produced by a flow casting method, was used. Next, the circumstance was returned to the pressure of the atmosphere, and ultraviolet rays were radiated thereon to cure the resin layer 7, thereby bonding the layer to the polycarbonate sheet. This was made into the light-transmitting layer 2 made of only the inner layer $2i$. In this way, disk sample No. 0 was produced.

[Production of Disk Sample No. 1]

The same procedure as in the production of disk sample No. 0 was performed till the formation of the inner layer $2i$ made of the polycarbonate sheet.

An ultraviolet curable resin SD-318 (manufactured by Nippon Kayaku Co., Ltd.) was applied onto the surface of the inner layer $2i$ by spin coating. Ultraviolet rays were radiated thereon to cure the resin, thereby forming a hard coat layer. The film thickness of the cured hard coat layer was 2.0 μm. Next, a $SiO_2$ target was used to form a $SiO_2$ layer having a thickness of 100 nm on the surface of the hard coat layer by sputtering. Before the formation of the $SiO_2$ layer, the hard coat layer surface was subjected to activating treatment with plasma etching. In this sample, the surface layer $2s$ was composed of the hard coat layer and the $SiO_2$ layer.

Furthermore, a silane coupling agent was chemically adsorbed on the surface of the $SiO_2$ layer as follows. A DSX (manufactured by Daikin Industries, Ltd.) having a water repellent and oil repellent group made of a fluorine-containing hydrocarbon was used as the silane coupling agent. A 0.1% (percentage by mass.) solution thereof in perfluorohexane was applied thereto by spin coating, and the resultant was heated at 60° C. in the air for 10 hours so as to cause the silane coupling agent to be chemically adsorbed on the above $SiO_2$ surface. In this way, produced was the light-transmitting layer 2 composed of the inner layer $2i$ and the surface layer $2s$, wherein the silane coupling agent was chemically adsorbed on the surface of the surface layer $2s$. In this way, disk sample No. 1 was produced.

Disk sample No. 1 had a better property for removing adhering fingerprints than disk sample No. 0 since the surface layer $2s$ having water repellency and oil repellency was formed on disk sample No. 1.

[Evaluation of Surfaces of the Disk Samples, Using Artificial Fingerprint Liquids]

(Preparation of Artificial Fingerprint Liquids)

To 10 g of methoxypropanol as a diluent was added 1.0 g of triolein, and thereto was further added 400 mg of Kanto loam of class 11 testing powder 1 prescribed in JIS Z8901. The mixture was stirred to yield artificial fingerprint liquid "a" (the present invention).

To 5 g of methoxypropanol as a diluent was added 200 mg of triolein, and thereto was further added 200 mg of keratin (originating from human epithelia, manufactured by Wako Pure Chemicals, Industries). The mixture was stirred, vigorously vibrated, and then allowed to stand still for 10 seconds. Next, the supernatant portion thereof in which keratin having large particle sizes was not present was quietly collected to yield artificial fingerprint liquid "b" (the present invention).

To 10 g of methoxypropanol as a diluent was added 1.0 g of triolein to yield artificial fingerprint liquid "c" (comparison).

(Formation of Original Plates for Pseudo Fingerprint Pattern Transfer)

About each of artificial fingerprint liquids "a", "b" and "c", an original plate for pseudo fingerprint pattern transfer was formed as follows. While artificial fingerprint liquid "a" was sufficiently stirred with a magnetic stirrer, about 1 mL thereof was collected. The collected liquid was applied onto a polycarbonate substrate (diameter: 120 mm, thickness: 1.2 mm) by spin coating. This substrate was heated at 60° C. for 3 minutes to remove methoxypropanol, which was the diluent which had become unnecessary, completely. In this way, original plate "a" for pseudo fingerprint pattern transfer was obtained. About artificial fingerprint liquids "b" and "c", original plates "b" and "c" for pseudo fingerprint pattern transfer were obtained, respectively, in the same way.

(Transfer and Wipe of the Pseudo Fingerprint Patterns)

As a pseudo fingerprint transferring stamp, there was used a product wherein a smaller end face (diameter: 12 mm) of a No. 1 silicone rubber plug was uniformly polished with a #240 abrasive paper (having the same performance as an AA240 abrasive paper described in the above JIS). The polished end face of the pseudo fingerprint transferring stamp was pressed against original plate "a" at a load of 29 N for 10 seconds to transfer components of the artificial fingerprint liquid to the end face of the transferring stamp. Next, the end face of the transferring stamp, onto which the artificial fingerprint liquid components adhered, was pressed against an area of the light-transmitting layer 2 surface of disk sample No. 0, the area being located about 40 mm apart in the radius direction from the center thereof, at a load of 29 N for 10 seconds so as to transfer the artificial fingerprint liquid "a" component. About disk sample No. 1, the artificial fingerprint liquid "a" component was transferred thereto in the same way.

In the same way, the original plates "b" and "c" were separately used to transfer artificial fingerprint liquid components onto respective disk samples No. 0 and No. 1.

Next, the artificial fingerprint liquid components adhering onto the respective disk samples were wiped off in the following steps. A product obtained by putting 8 pieces of commercially available tissue paper (manufactured by Crecia Corp.) on each other was sandwiched between a larger end face (diameter: 16 mm). of the No. 1 rubber plug and the light-transmitting layer 2 surface onto which the artificial fingerprint liquid component adhered, and the resultant was pressed at a strength of 4.9 N. In this state, the rubber plug was slowly shifted from the center of the disk sample to the outer circumference thereof to wipe off the adhering artificial fingerprint liquid component.

About each of the disk samples, the jitter of recorded signals was measured at the following separate times: a time before the artificial fingerprint liquid component adhered (initial), a time immediately after the artificial fingerprint liquid component adhered (before the wipe), and times after performing the wiping-off operation 2 times, 5 times, 10 times and 15 times. The results are shown in Table 1.

Respective parameters of the optical system of an optical information medium evaluating system used to record and reproduce signals, and recording/reproducing conditions are as follows.

Laser wavelength: 405 nm

Numerical aperture NA of objective lens: 0.85

Linear velocity: 6.5 m/s

Recording signal: 1–7 modulating signals (shortest signal length: 2T)

Recording areas: Lands and grooves (Table 1 shows only measurement results of the groove portions)

TABLE 1

| | Disk sample No. | Initial stage | Immediately after the adhesion of the fingerprint liquid | After wiping the liquid one time | After wiping the liquid 2 times | After wiping the liquid 5 times | After wiping the liquid 10 times | After wiping the liquid 15 times |
|---|---|---|---|---|---|---|---|---|
| | | | Jitter (unit: %) | | | | | |
| Artificial fingerprint liquid "a" (the present invention) | 0 | 7.2 | 22.0 | 14.1 | 10.3 | 8.8 | 8.7 | 9.2 |
| | 1 | 7.1 | 22.1 | 9.4 | 7.8 | 7.4 | 7.2 | 7.2 |
| Artificial fingerprint liquid "b" (the present invention) | 0 | 7.1 | 24.0 | 13.7 | 8.8 | 8.5 | 8.2 | 8.9 |
| | 1 | 7.2 | 23.5 | 9.1 | 7.5 | 7.2 | 7.1 | 7.1 |
| Artificial fingerprint liquid "c" (comparison) | 0 | 7.1 | 11.1 | 9.7 | 7.5 | 7.9 | 8.5 | 9.1 |
| | 1 | 7.2 | 15.8 | 9.8 | 7.9 | 7.2 | 7.2 | 7.2 |

Table 1 demonstrates that when artificial fingerprint liquid "a" or "b" of the present invention is used, it can be quantitatively determined using the jitter value that disk sample No. 1 is better in the property for removing the adhering artificial fingerprint liquid component than disk sample No. 0 since the surface layer 2s having water repellent and oil repellent performance is formed in disk sample No. 1. It can be quantitatively determined using the jitter value that about disk sample No. 1, as the number of the wiping operations is more, the adhering artificial fingerprint liquid component is removed in a more amount so that the initial performance of the optical disk can be restored. The reason why about disk sample No. 0 the jitter value deteriorated slightly after the number of the wiping operations became 15 can be considered as follows: since the hardness of the light-transmitting layer 2 of sample No. 0 was low, scratches were generated in the surface by the wiping operations.

On the other hand, in the case that artificial fingerprint liquid "C" was used, the artificial fingerprint liquid component was not fixed on the light-transmitting layer 2 surface and about both of disk samples No. 0 and No. 1 the jitter values after wiping this fingerprint liquid one time were substantially equal. As described above, water repellent and oil repellent performances between disk samples cannot be distinguished. Thus, artificial fingerprint liquid "c" is unsuitable as an artificial fingerprint liquid used to evaluate surface performances.

In this Example 1, the optical recording disks were used as the objects to be evaluated, and the usefulness of the artificial fingerprint liquid of the present invention was shown. The artificial fingerprint liquid of the present invention can be used to evaluate, quantitatively and with a good reproducibility, the anti-staining property, and the fingerprint adhering property or the fingerprint removing property of not only the optical recording disks but also various other surfaces. Thus, Example 1 is a mere example in all ways, and the present invention should not be interpreted as being limited thereto. Furthermore, all modifications belonging to a scope equivalent to that of the claims are within the scope of the present invention.

Example 2

Production of Optical Information Media Having Improved Fingerprint Removing Property Each of optical recording disk samples having the layer structure illustrated in FIG. 3 was produced in the manner described below. In sample No. 0, however, its light-transmitting layer 2 was made to have a single-layered structure.

Sample No. 0: the same as disk sample No. 0 produced in Example 1

Sample No. 1: the same as disk sample No. 1 produced in Example 1

[Production of Sample No. 2]

The same procedure as in the production of disk sample No. 0 was performed till the formation of the inner layer 2i made of the polycarbonate sheet.

A Desolight Z7503 (manufactured by JSR Co., Ltd.) was applied, as an ultraviolet curable resin in which colloidal silica was dispersed, onto the surface of the inner layer 2i by spin coating, and dried at 60° C. for 3 minutes to remove the diluting solvent. Thereafter, ultraviolet rays were radiated thereon to cure the resin, thereby forming the surface layer 2s. The film thickness after being cured was 3.0 µm.

Next, fluorine plasma treatment was applied to the surface of the surface layer 2s. As the fluorinated compound, tetrafluoromethane ($CF_4$) was used. The inside of a chamber of the plasma treatment device was degassed and then $CF_4$ gas was introduced into the chamber to adjust the pressure into 0.5 Pa. Next, an RF electric field was applied thereto so as to conduct the plasma treatment at a power of 100 W. The time for the treatment was set into 3 minutes. After the end of the plasma treatment, the inside of the chamber was returned to the normal pressure, and the disk was taken out.

[Production of Sample No. 3]

The same procedure as in the production of disk sample No. 0 was performed till the formation of the inner layer 2i made of the polycarbonate sheet.

An ultraviolet curable resin (HOD 3200 manufactured by Nippon Kayaku Co., Ltd.) was applied, as a primer, onto the inner layer 2i, and then cured by radiation of ultraviolet rays. The film thickness of the resin after being cured was 0.5 µm.

Next, a thermosetting silicone coating agent (Fllesera D, manufactured by Matsushita Electric Industrial Co., Ltd.) was applied onto the primer layer by spin coating, and heated at 80° C. for 2 hours so as to be dried and set. In this way, the surface layer 2s was formed. The thickness of the surface layer 2s was 1.0 µm.

The above-mentioned silicone coating agent has a structure wherein a lubricant, water repellent and oil repellent group is introduced into the silicon atom of an organic silicon compound which is a monomer component, and the coating after being set has a structure wherein the lubricant, water repellent and oil repellent group is fixed through a chemical bond to the silicon atom of a polysiloxane bond.

[Production of Sample No. 4]

The same procedure as in the production of disk sample No. 0 was performed till the formation of the inner layer 2i made of the polycarbonate sheet.

A DLC thin film having a thickness of 360 nm was formed as the surface layer 2s on the inner layer 2i by plasma CVD. As the process gas, ethylene ($C_2H_4$) was used. The inside of a chamber of the plasma treatment device was degassed and then ethylene gas was introduced into the chamber to adjust the pressure into 0.5 Pa. Next, an RF electric field was applied thereto so as to form the film by CVD at a power of 100 W. The time for the treatment was set into 3 minutes. After the end of the plasma treatment, the inside of the chamber was returned to the normal pressure, and the disk was taken out.

[Production of Sample No. 5]

An optical recording disk sample was produced in the same way for producing sample No. 1 except that no silane coupling agent layer was formed on the surface of the $SiO_2$ layer.

[Production of Sample No. 6]

The same procedure as in the production of disk sample No. 0 was performed till the formation of the inner layer 2i made of the polycarbonate sheet.

An ultraviolet curable resin (SD 318 manufactured by Nippon Kayaku Co., Ltd.) was applied onto the inner layer 2i by spin coating, and then cured by radiation of ultraviolet rays, so as to form the surface layer 2s having a thickness of 2.0 µm.

Next, a solution wherein silicone oil (KF96, manufactured by Shin-Etsu Chemical Co., Ltd., viscosity: 10000 cP) was diluted with butyl acetate was applied onto the surface of the surface layer 2s by spin coating, so as to form a layer having water repellency, oil repellency and lubricity. In this way, an optical recording disk sample was produced. The amount of the applied silicone oil was 32 $mg/M^2$, and the thickness of the formed layer was 33 nm.

[Production of Sample No. 7]

The same procedure as in the production of disk sample No. 0 was performed till the formation of the inner layer 2i made of the polycarbonate sheet.

An ultraviolet curable resin (SD 318 manufactured by Nippon Kayaku Co., Ltd.) was applied onto the inner layer 2i by spin coating, and then cured by radiation of ultraviolet rays, so as to form the surface layer 2s having a thickness of 2.0 µm.

Next, a solution wherein a perfluoropolyether derivative (Fonbrin ZDOL, manufactured by Ausimont K. K.) was diluted with a fluorine type solvent (H-GALDEN ZV100, manufactured by Ausimont K. K.) was applied onto the surface of the hard coat layer by spin coating, so as to form a layer having water repellency, oil repellency and lubricity. In this way, an optical recording disk sample was produced. The amount of the applied perfluoropolyether derivative was 35 $mg/m^2$, and the thickness of the formed layer was 19 nm.

[Production of Sample No. 8]

An optical recording disk sample was produced in the same way for producing sample No. 2 except that no fluorine plasma treatment was conducted.

[Production of Sample No. 9]

Instead of the silane coupling agent DSX used in sample No. 1, trifluoromethyltrimethoxysilane ($CF_3Si(OCH_3)_3$) was used. A coating solution was prepared by dissolving trifluoromethyltrimethoxysilane into m-xylenehexafluoride so as to have a concentration of 0.1% by mass. In the same way for producing sample No. 1 except this, an optical recording disk sample was produced.

[Evaluation]

About each of the above-mentioned optical disk samples, the contact angle of water to its light-transmitting layer surface and the change rate (deterioration degree) thereof were measured according to the following procedure.

First, a silicone rubber plug the end face of which had a diameter of 16 mm was covered with a dried cloth (Bemcot Lint Free CT-8, manufactured by Asahi Chemical Co., Ltd.), and the portion of the cloth with which the vicinity of the silicone rubber plug end face was covered was impregnated with 2.0 mL of an artificial fingerprint liquid. This artificial fingerprint liquid was a liquid obtained by adding 4.0 g of Kanto loam of class 11 testing powder 1 prescribed in JIS Z8901 to 10 g of triolein and stirring the resultant sufficiently, The Kanto loam contains, as main components thereof, $SiO_2$, $Fe_2O_3$, $Al_2O_3$ and others, and the median diameter thereof is from 1.6 to 2.3 μm. Next, the end face of the silicone rubber plug was pressed perpendicularly to the surface of the light-transmitting layer surface of each of the samples at a load of 4.9 $N/cm^2$ with the cloth impregnated with the artificial fingerprint liquid component being sandwiched therebetween, and slid 50 times in a reciprocating motion along the radius direction of the sample.

Next, the silicone rubber plug and cloth were newly prepared, and the cloth was impregnated with 2.0 mL of ethanol in the same way as described above. Thereafter, the end face of the silicone rubber was pressed to the portion previously scrubbed with the cloth containing triolein at a load of 2.5 $N/cm^2$ with the cloth impregnated with ethanol being sandwiched therebetween. The end face was slid 20 times in the radius direction of the sample.

Next, the cloth was exchanged with a new cloth. The cloth was impregnated with ethanol in the same way as described above, and the cloth was again slid 20 times on the same portion. Ethanol was completely dried and then static electricity was removed by an ionizer. Thereafter, the contact angle was measured. The measurement of the contact angle was performed under the environment having a temperature of 20° C. and a relative humidity of 60%, using a contact angle meter CA-D manufactured by Kyowa Interface Science Co., Ltd. The results are shown in Table 2. Table 2 also shows the change rate of the contact angle. This change rate is the percentage of a value calculated from the following equation, using the initial contact angle and the contact angle after the artificial fingerprint liquid was adhered and wiped off (the contact angle after the sliding in Table 2):

(Value After the Sliding—Initial Value)/Initial Value

The kinetic friction coefficient of the light-transmitting layer surface was measured according to the following procedure. A nylon chip the tip of which had a curvature radius of 5 mm was formed and this was brought into contact with the light-transmitting layer surface of each of the samples at a constant load, and the sample was, as it was, rotated at a constant speed. From the load and the torque at this time, the kinetic friction coefficient was calculated. For the measurement, a remodeled optical disk driving device was used. The nylon chip was fitted to the optical head section of the driving device. The device was made to make it possible to measure the torque applied to the chip when the nylon chip was slid on the sample surface, that is, the frictional force Fd with a torque meter. In this measurement, the load (normal-force Fp) when the nylon chip was brought into contact with the sample surface was set into 20 mN, and the linear velocity when the sample was rotated was set into 1.4 m/s. The kinetic friction coefficient μ can be obtained from Fd/Fp.

The kinetic friction coefficient was measured at the initial stage and after the artificial fingerprint liquid was adhered and wiped off (after the sliding) in the same way as in the measurement of the contact angle. The initial kinetic friction coefficient, the kinetic friction coefficient after the sliding, and a difference between the two (change quantity) are together shown in Table 2.

TABLE 2

| | | | Kinetic friction coefficient | | | Contact angle | | |
|---|---|---|---|---|---|---|---|---|
| Sample No. | Pencil hardness | ΔHaze (%) | Initial stage | After the sliding | Change quantity | Initial stage (deg) | After the sliding (deg) | Change rate (%) |
| 0 | B | 38.2* | —[1] | —[1] | — | 83.2 | 81.5 | −2.0 |
| 1 | HB | 3.2 | 0.23 | 0.24 | 0.01 | 113.5 | 112.0 | −1.3 |
| 2 | HB | 2.0 | 0.25 | 0.38 | 0.01 | 106.4 | 102.8 | −3.4 |
| 3 | HB | 5.1 | 0.22 | 0.24 | 0.02 | 104.6 | 102.1 | −2.4 |
| 4 | HB | 6.7 | 0.34 | 0.35 | 0.01 | 79.8 | 79.5 | −0.4 |
| 5 | HB | 3.3 | 0.55* | 0.53 | −0.02 | 18.5* | 18.0 | −2.7 |
| 6 | HB | 8.5 | 0.20 | 0.56 | 0.36* | 87.2 | 70.1 | −19.6* |
| 7 | HB | 8.9 | 0.35 | 0.60 | 0.35* | 100.2 | 74.2 | −25.9* |
| 8 | HB | 2.1 | 0.81* | 0.78 | −0.03 | 72.5* | 72.0 | −0.7 |
| 9 | HB | 3.0 | 0.48* | 0.49 | 0.01 | 113.8 | 112.5 | −1.1 |

[1]Unable to be measured since the light-transmitting layer surface was injured immediately after the chip was slid
*Outside the limited range As is evident from Table 2, in samples No. 1 and No. 2, the substituent having water repellency, oil repellency and lubricity was fixed to the surface layer 2s (or the surface layer 2s per se had water repellency, oil repellency and lubricity); therefore, the contact angle hardly deteriorated even if they were scrubbed with the cloth impregnated with triolein, and further the kinetic friction coefficient thereof hardly changed. On the other hand, in samples No. 6 and No. 7, the water repellency, oil repellency and lubricity were kept by the lubricant layer formed on the surface and having fluidity; therefore, the contact angle were easily lowered by the sliding of the cloth impregnated with triolein, and further the kinetic friction coefficient thereof increased. It is presumed from these results that when a fingerprint adheres, the fingerprint components are mixed with the lubricant so that it becomes difficult to wipe off the fingerprint. In sample No. 5, the light-transmitting layer surface was made of the glass components. Thus, the initial contact angle was very small.

Example 3

Method for Evaluating Fingerprint Removing Property of Optical Information Media About samples No. 0 to No. 9 produced in Example 2, the fingerprint removing property of the light-transmitting layer surface thereof was evaluated by a method described below.

There were used the same artificial fingerprint liquid "a" (the present invention), the artificial fingerprint liquid "b" (the present invention) and the artificial fingerprint liquid "c" (comparison) prepared in Example 1.

About the artificial fingerprint liquids "a", "b" and "c", original plates "a", "b" and "c" for pseudo fingerprint pattern transfer were obtained, respectively, by the same operation as in Example 1. Each of the original plates "a", "b" and "c" was used to transfer artificial fingerprint liquid components onto each of disk samples No. 0 to No. 9 by the same operation as in Example 1.

Next, the artificial fingerprint liquid components adhering to the surface of each of the disk sample surfaces were wiped off by the same operation as in Example 1.

Figure 4:
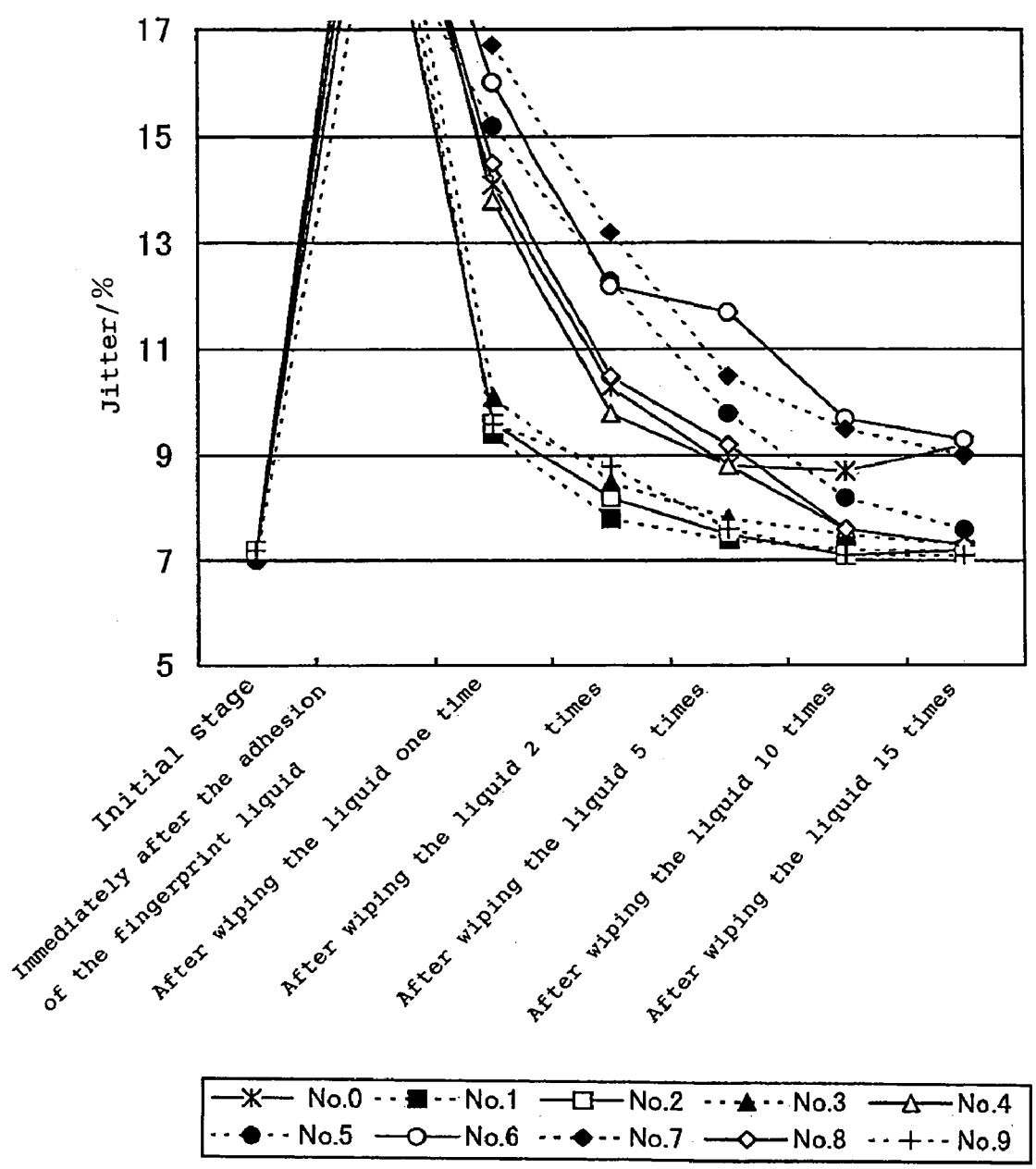
FIG. 4 is a graph showing a relationship between the number of wipes of a pseudo fingerprint adhering to the surface of the optical recording disk and the jitter of the optical recording disk in Example 3.

About each of the disk samples, the jitter of recorded signals was measured at the following separate times: a time before the artificial fingerprint liquid components adhered (initial), a time immediately after the artificial fingerprint liquid components adhered (before the wipe), and times after performing the wiping-off operation 2 times, 5 times, 10 times and 15 times. The results are shown in Table 3. Results when the pseudo fingerprint component "a" was used are also shown in FIG. 4.

Respective parameters of the optical system of an optical information medium evaluating system used to record and reproduce signals, and recording/reproducing conditions are as follows.

Laser wavelength: 405 nm
Numerical aperture NA of objective lens: 0.85
Linear velocity: 6.5 m/s
Recording signal: 1–7 modulating signals (shortest signal length: 2T)
Recording areas: Lands and grooves (Table 3 shows only measurement results of the groove portions)

A sensuous evaluation (sensory test) was also made on the fingerprint removing easiness. First, each of the artificial fingerprint liquid components was adhered to the surface of each of the samples under the above-mentioned conditions. Next, about these samples, 5 monitors selected at will made a wiping-off test, and evaluated the wiping-off easiness into 3 ranks. The results are shown in Table 4. The standard of the evaluation shown in Table 4 is as follows:

A: A fingerprint is very easily wiped off.
B: A fingerprint is easily wiped off.
C: A fingerprint is not easily wiped off.

Commercially available tissue paper (manufactured by Crecia Corp.) was used for the wiping-off, and the number of the wiping operations and the wiping load were not particularly specified.

TABLE 3

| | | | Jitter (unit: %) | | | | | |
|---|---|---|---|---|---|---|---|---|
| | Sample No. | Initial stage | Immediately after the adhesion of the fingerprint liquid | After wiping the liquid one time | After wiping the liquid 2 times | After wiping the liquid 5 times | After wiping the liquid 10 times | After wiping the liquid 15 times |
| Artificial fingerprint liquid "a" | 0 | 7.2 | 22.0 | 14.1 | 10.3 | 8.8 | 8.7 | 9.2 |
| | 1 | 7.1 | 22.1 | 9.4 | 7.8 | 7.4 | 7.2 | 7.2 |
| | 2 | 7.2 | 21.0 | 9.6 | 8.2 | 7.5 | 7.1 | 7.2 |
| | 3 | 7.2 | 22.7 | 10.1 | 8.5 | 7.8 | 7.5 | 7.3 |
| | 4 | 7.1 | 22.9 | 13.8 | 9.8 | 8.8 | 7.6 | 7.3 |
| | 5 | 7.0 | 19.5 | 15.2 | 12.3 | 9.8 | 8.2 | 7.6 |
| | 6 | 7.2 | 23.0 | 16.0 | 12.2 | 11.7 | 9.7 | 9.3 |
| | 7 | 7.2 | 22.0 | 16.7 | 13.2 | 10.5 | 9.5 | 9.0 |
| | 8 | 7.2 | 22.1 | 14.5 | 10.5 | 9.2 | 7.6 | 7.3 |
| | 9 | 7.2 | 21.2 | 9.6 | 8.8 | 7.6 | 7.1 | 7.1 |
| Artificial fingerprint liquid "c" (comparison) | 0 | 7.1 | 11.1 | 9.7 | 7.5 | 7.9 | 8.5 | 9.1 |
| | 1 | 7.2 | 15.8 | 9.8 | 7.9 | 7.2 | 7.2 | 7.2 |
| | 2 | 7.2 | 15.3 | 10.0 | 8.2 | 7.5 | 7.2 | 7.2 |
| | 3 | 7.1 | 14.3 | 10.2 | 8.1 | 7.3 | 7.2 | 7.1 |
| | 4 | 7.1 | 12.0 | 9.5 | 8.3 | 7.2 | 7.3 | 7.1 |
| | 5 | 7.1 | 10.2 | 9.5 | 7.5 | 7.1 | 7.1 | 7.1 |
| | 6 | 7.2 | 16.1 | 11.0 | 8.2 | 7.4 | 7.2 | 7.2 |
| | 7 | 7.2 | 15.7 | 12.3 | 8.3 | 7.5 | 7.1 | 7.2 |
| | 8 | 7.2 | 11.8 | 11.3 | 7.9 | 7.8 | 7.2 | 7.2 |
| | 9 | 7.2 | 16.2 | 9.4 | 7.5 | 7.1 | 7.2 | 7.1 |
| Artificial fingerprint liquid "b" | 0 | 7.1 | 24.0 | 13.7 | 8.8 | 8.5 | 8.2 | 8.9 |
| | 1 | 7.2 | 23.5 | 9.1 | 7.5 | 7.2 | 7.1 | 7.1 |

TABLE 4

| Sample No. | Kinetic friction coefficient | Sensuous evaluation/ the number of persons | | |
|---|---|---|---|---|
| | | A | B | C |
| 0 | Unable to be measured | 0 | 1 | 4 |
| 1 | 0.23 | 5 | 0 | 0 |
| 2 | 0.25 | 5 | 0 | 0 |
| 3 | 0.22 | 5 | 0 | 0 |
| 4 | 0.34 | 3 | 2 | 0 |
| 5 | 0.55* | 0 | 2 | 3 |
| 6 | 0.20 | 4 | 1 | 0 |
| 7 | 0.35 | 3 | 2 | 0 |
| 8 | 0.81* | 0 | 0 | 5 |
| 9 | 0.48* | 1 | 2 | 2 |

A: A fingerprint is very easily wiped off.
B: A fingerprint is easily wiped off.
C: A fingerprint is not easily wiped off.
*Outside the limited range About samples No. 1 to No. 4, wherein the contact angle of the light-transmitting layer 2 surface and the change rate thereof were within the given ranges in Table 2, evaluation was made using artificial fingerprint liquid component "a" as shown in Table 3 and FIG. 4. In this case, the jitter of recorded signals was restored to a level substantially equal to that before the adhesion of the fingerprint immediately after the wiping-off of the pseudo fingerprint 2 or 5 times. On the other hand, about the samples other than them, in particular, samples No. 6 and No. 7, which had high water repellency, oil repellency and lubricity, the jitter thereof was not restored to the initial value by the operation of wiping off the fingerprint 15 times. It is evident from these facts that the fingerprint removing property does not depend on only the water repellency and the oil repellency, that is, only the magnitude of the surface energy. In other words, in the case that the water repellency and the oil repellency are realized by fluid materials in the lubricant layer formed on the surface, a layer resulting from exudation of water repellent and oil repellent agents, which are previously added to the material of the light-transmitting layer, to the surface, and other layers even if the water repellency and the oil repellency are high, the fingerprint removing property deteriorates inversely.

On the other hand, in the case that evaluation was made using artificial fingerprint liquid component "c", which was made of an homogeneous system containing no Kanto loam, the artificial fingerprint liquid component was not fixed on the light-transmitting layer 2 surface and all of the samples had the same wiping-off property as is clear form the results shown in Table 3. In other words, in this case, actual fingerprint adhering property and removing property cannot be reproduced or quantitatively analyzed. Evidently, it is unsuitable as a testing method for optical information media.

About sample No. 0, the initial contact angle was within the given range in Table 2, and the contact angle after the sliding based on the artificial fingerprint liquid component hardly deteriorated. However, scratches were generated in the surface by the wiping-off operation since the hardness of the light-transmitting layer surface was low. Therefore, when the artificial fingerprint liquid was wiped off more than 10 times, the jitter deteriorated reversely.

As shown in Table 4, the fingerprint removing property sensuously judged by the users was not necessarily consistent with the rank shown in Table 3. For example, when samples No. 1 and No. 9 were compared with each other, the two were excellent in water repellency and oil repellency and the surface hardness of the light-transmitting layer was also high. However, it is judged in Table 4 that about sample No. 1 the fingerprint thereon was very easily wiped off whereas it is judged that about sample No. 9 the fingerprint was not necessarily easily wiped off. This is because the kinetic friction coefficient of the light-transmitting layer 2 surface of sample No. 9 was high. It is therefore evident from these results that in order to make the fingerprint removing property which users sensuously judges very good, it is necessary not only to make the water repellency, oil repellency and hardness high but also to decrease the kinetic friction coefficient.

When pseudo fingerprint component "b", which contained keratin instead of the inorganic particle-form-material was used, substantially the same results as in the case of using pseudo fingerprint component "a" were obtained. It is clear from these results that the present invention, in which the artificial fingerprint liquid component containing an inorganic particle-form substance is used, makes it possible to simulate the influence of the adhesion of actual fingerprints quantitatively and with a good reproducibility.

The above-mentioned Examples are mere examples in all points, and the present invention should not be restrictedly interpreted. Furthermore, all modifications belonging to a scope equivalent to that of the claims are within the scope of the present invention.

INDUSTRIAL APPLICABILTY

According to the present invention, provided is a low-cost artificial fingerprint liquid for quantitatively and with a good reproducibility evaluating an anti-staining property, and a fingerprint adhering property or a fingerprint removing property on the surface of an optical disk such as a reproduction-only optical disk, optical recording disk, magneto-optical recording disk, various displays such as a CRT, and various substances such as glass.

In the testing method of the present invention, influence which recording/reproducing signals receive when a fingerprint adheres to an optical information medium can be measured quantitatively and with a good reproducibility. Furthermore, the optical information medium of the present invention can maintain good recording/reproducing property over a long period since the medium has a good property for wiping off organic stains adhering to the surface thereof, such as a fingerprint.

The invention claimed is:
1. A testing method for an optical information medium, wherein an anti-staining property and/or a fingerprint adhering property of the surface of the optical information medium which is on the incident side of a recording/reproducing beam is/are evaluated by adhering an artificial fingerprint liquid comprising a fine-particle-form substance and a dispersion medium capable of dispersing the fine-particle-form substance onto the medium surface which is on the incident side of the recording/reproducing beam,
wherein the fine-particle-form substance includes at least one selected from the group consisting of silica fine particles, alumina fine particles, iron oxide fine particles, keratin fine particles, chitin fine particles, chitosan fine particles, acrylic fine particles, styrene fine particles, divinylbenzene fine particles, polyamide fine particles, polyimide fine particles, polyurethane fine particles, and melamine fine particles, and/or includes Kanto loam (JIS TEST POWDER 1), and wherein the dispersion medium is at least one selected from a higher fatty acid, a derivative of the higher fatty acid, terpenes, and derivatives of terpenes.

2. The testing method for an optical information medium according to claim 1, wherein the anti-staining property and/or the fingerprint adhering property of the surface which is on the incident side of the recording/reproducing beam is/are evaluated by measuring changes in recording property and/or reproducing property generated by the adhesion of the artificial fingerprint liquid.

3. The testing method for an optical information medium according to claim 1, which is applied to the optical information medium wherein the smallest diameter of the recording/reproducing beam on the surface which is on the incident side of the recording/reproducing beam is 500 µm or less.

4. A testing method for an optical information medium, wherein a cleaning property and/or a fingerprint removing property of the surface of the medium which is on the incident side of a recording/reproducing beam is/are evaluated by adhering an artificial fingerprint liquid comprising a fine-particle-form substance and a dispersion medium capable of dispersing the fine-particle-form substance onto the medium surface which is on the incident side of the recording/reproducing beam, and subsequently performing an operation for removing the artificial fingerprint liquid, wherein the fine-particle-form substance includes at least one selected from the group consisting of silica fine particles, alumina fine particles, iron oxide fine particles, keratin fine particles, chitin fine particles, chitosan fine particles, acrylic fine particles, styrene fine particles, divinylbenzene fine particles, polyamide fine particles, polyimide fine particles, polyurethane fine particles, and melamine fine particles, and/or includes Kanto loam (JIS TEST POWDER 1), and wherein the dispersion medium is at least one selected from a higher fatty acid, a derivative of the higher fatty acid, terpenes, and derivatives of terpenes.

5. The testing method for an optical information medium according to claim 4, wherein the cleaning property and/or the fingerprint removing property of the surface which is on the incident side of the recording/reproducing beam is/are evaluated by measuring changes in recording property and/or reproducing property generated by the operation for removing the artificial fingerprint liquid.

6. The testing method for an optical information medium according to claim 4, which is applied to the optical information medium wherein the smallest diameter of the recording/reproducing beam on the surface which is on the incident side of the recording/reproducing beam is 500 µm or less.

* * * * *